US011922891B2

(12) United States Patent
Park et al.

(10) Patent No.: US 11,922,891 B2
(45) Date of Patent: Mar. 5, 2024

(54) DATA DRIVER THAT SETS DATA OUTPUT ORDERS OF CHANNELS BASED ON DATA OUTPUT ORDER INFORMATION AND A DISPLAY DEVICE INCLUDING THE SAME

(71) Applicant: SAMSUNG DISPLAY CO., LTD., Yongin-si (KR)

(72) Inventors: Se Hyuk Park, Yongin-si (KR); Seung Jae Lee, Yongin-si (KR)

(73) Assignee: SAMSUNG DISPLAY CO., LTD., Suwon-si (KR)

( * ) Notice: Subject to any disclaimer, the term of this patent is extended or adjusted under 35 U.S.C. 154(b) by 0 days.

(21) Appl. No.: 18/114,383

(22) Filed: Feb. 27, 2023

(65) Prior Publication Data

US 2023/0215391 A1 Jul. 6, 2023

Related U.S. Application Data

(63) Continuation of application No. 17/738,303, filed on May 6, 2022, now Pat. No. 11,594,188.

(30) Foreign Application Priority Data

Sep. 24, 2021 (KR) ........................ 10-2021-0126554

(51) Int. Cl.
*G09G 3/3291* (2016.01)
*G09G 3/20* (2006.01)
*G09G 3/36* (2006.01)

(52) U.S. Cl.
CPC ......... *G09G 3/3291* (2013.01); *G09G 3/2007* (2013.01); *G09G 3/2096* (2013.01);
(Continued)

(58) Field of Classification Search
CPC .................................................... G09G 3/3291
See application file for complete search history.

(56) References Cited

U.S. PATENT DOCUMENTS 10,249,234 B2 4/2019 Kim
2020/0394967 A1 12/2020 Park et al.
(Continued)

FOREIGN PATENT DOCUMENTS

KR 10-0658934 12/2006
KR 10-2017-0037757 4/2017
KR 10-2020-0143558 12/2020

*Primary Examiner* — Gustavo Polo
(74) *Attorney, Agent, or Firm* — F. Chau & Associates, LLC

(57) ABSTRACT

A display device including: a display panel including first and second display areas, and including pixels in the first and second display areas; and a data driver to output data signals to the pixels through a channels arranged along a first direction, wherein the channels include a first channel group corresponding to the first display area and a second channel group corresponding to the second display area, wherein some of the pixels emit light in different colors and have a first pixel arrangement along the first direction, and based on channel selection information about the first or second channel groups, the data driver outputs first data signals in a first output order along the first direction corresponding to the first pixel arrangement through the first channel group, and outputs second data signals in a second output order different from the first output order through the second channel group.

19 Claims, 22 Drawing Sheets

| Name | Decription | Value | Example (m=2250) |
|---|---|---|---|
| DCFF | RGB Data Order Control | HH | CH1(R), CH2(G), CH3(B), ... CH2248(R), CH2249(G), CH2250(B) |
| | | LL | CH1(B), CH2(G), CH3(R), ... CH2248(B), CH2249(G), CH2250(R) |
| | | HL | Start with RGB -> BGR on selected channels -> RGB again |
| | | LH | Start with BGR -> RGB on selected channels -> BGR again |
| SCFF | Order Change Channel | HH | CH1126 ~ CH2250 |
| | | HL | CH1126 ~ CH1500 |
| | | LH | CH751~ CH2250 |
| | | LL | CH751 ~ CH1500 |

(52) U.S. Cl.
CPC ... *G09G 3/3688* (2013.01); *G09G 2300/0452* (2013.01); *G09G 2310/027* (2013.01); *G09G 2320/0233* (2013.01); *G09G 2320/0673* (2013.01); *G09G 2370/08* (2013.01)

(56) References Cited

U.S. PATENT DOCUMENTS

| | | | | |
|---|---|---|---|---|
| 2021/0174759 | A1* | 6/2021 | Ko | G09G 3/3225 |
| 2021/0343211 | A1 | 11/2021 | Liu | |

* cited by examiner

FIG. 12

| Name | Decription | Value | Example (m=2250) |
|---|---|---|---|
| DCFF | RGB Data Order Control | HH | CH1(R), CH2(G), CH3(B), ... CH2248(R), CH2249(G), CH2250(B) |
| | | LL | CH1(B), CH2(G), CH3(R), ... CH2248(B), CH2249(G), CH2250(R) |
| | | HL | Start with RGB -> BGR on selected channels -> RGB again |
| | | LH | Start with BGR -> RGB on selected channels -> BGR again |
| SCFF | Order Change Channel | HH | CH1126 ~ CH2250 |
| | | HL | CH1126 ~ CH1500 |
| | | LH | CH751~ CH2250 |
| | | LL | CH751 ~ CH1500 |

<MODE1>

<MODE3>

DATA DRIVER THAT SETS DATA OUTPUT ORDERS OF CHANNELS BASED ON DATA OUTPUT ORDER INFORMATION AND A DISPLAY DEVICE INCLUDING THE SAME

CROSS-REFERENCE TO RELATED APPLICATIONS

This application is a continuation of U.S. patent application Ser. No. 17/738,303 filed on May 6, 2022, which claims priority under 35 U.S.C. § 119 to Korean Patent Application No. 10-2021-0126554, filed on Sep. 24, 2021, the disclosures of which are incorporated by reference herein in their entireties.

TECHNICAL FIELD

The disclosure relates to a display device, and more particularly, to a data driver and a display device including the same.

DESCRIPTION OF THE RELATED ART

A display device is an output device for presentation of information in visual form and includes a display panel including pixels and a driver for driving the display panel. Each of the pixels emits light with a luminance corresponding to a data signal provided through a corresponding data line in response to a scan signal provided through a corresponding scan line.

The display panel includes a display area in which the pixels are provided, and a non-display area devoid of the pixels. The driver may be provided in the non-display area, or connected to the non-display area. A display device with a small non-display area, such as a bezelless display and a slideable display, is being developed.

SUMMARY

Pixels emitting light in different colors are arranged in a display panel according to a specific pixel arrangement among various pixel arrangements such as RGB and RGBG. As a non-display area is reduced, a line area in which lines connecting the pixels and a driver are disposed may also be reduced. In this case, pixels disposed in some areas of the display panel may be connected to output channels of the driver in a first output order (for example, an RGB order). However, pixels disposed in another area of the display panel (for example, pixels connected through fan-out lines in the display area due to the reduction of the line area) may be connected to the output channels of the driver in a second output order (for example, a BGR order).

An embodiment of the disclosure provides a data driver capable of outputting data signals through some output channels in an output order different from that of other output channels, and a display device including the data driver.

An embodiment of the disclosure provides a data driver capable of changing an output order of output channels for each frame or line in a frame, and a display device including the data driver.

According to an embodiment of the disclosure, a display device includes: a display panel including a first display area and a second display area, and including pixels disposed in the first and second display areas; and a data driver configured to output data signals to the pixels through a plurality of channels arranged along a first direction, wherein the channels include a first channel group corresponding to the first display area and a second channel group corresponding to the second display area, wherein at least some of the pixels emit light in different colors and are arranged in a first pixel arrangement along the first direction, and wherein, based on channel selection information about the second channel group or the first channel group, the data driver outputs first data signals in a first output order along the first direction corresponding to the first pixel arrangement through the first channel group, and outputs second data signals in a second output order different from the first output order along the first direction through the second channel group.

The data driver may be one integrated circuit.

The second output order may be a reverse order of the first output order.

The first pixel arrangement may include a first color pixel, a second color pixel, and a third color pixel sequentially arranged along the first direction.

The first pixel arrangement may include a first color pixel, a second color pixel, a third color pixel, and the second color pixel sequentially arranged along the first direction.

The first channel group may include a first channel, a second channel, and a third channel sequentially arranged along the first direction, wherein the data driver outputs a first data signal to the first channel, a second data signal to the second channel, and a third data signal to the third channel according to the first output order, wherein the second channel group includes a fourth channel, a fifth channel, and a sixth channel sequentially arranged along the first direction, wherein the data driver outputs the third data signal to the fourth channel, the second data signal to the fifth channel, and the first data signal to the sixth channel according to the second output order, and wherein voltage ranges of the first, second, and third data signals are different from each other.

The data driver may include: a first digital-to-analog converter configured to generate at least one of the data signals using first gamma voltages of a first voltage range; a second digital-to-analog converter configured to generate at least one of the data signals using second gamma voltages of a second voltage range; and a third digital-to-analog converter configured to generate at least one of the data signals using third gamma voltages of a third voltage range, wherein each of the channels is connected to one of the first to third digital-to-analog converters, and a connection order between the first to third digital-to-analog converters and channels in the second channel group is changed based on the channel selection information.

The channel selection information may include a first value indicating a first channel in the second channel group and a second value indicating a last channel in the second channel group.

The data driver may change an output order of the first data signals output through the first channel group based on data output order information.

The data driver may output the first data signals in the first output order or the second output order through channels in the first channel group, and outputs the second data signals in the second output order or the first output order through channels in the second channel group, according to the data output order information.

The display device may further include: a timing controller configured to provide image data for the first pixel arrangement, the channel selection information, and the data output order information to the data driver, wherein the data driver generates first and second data signals based on the image data.

The timing controller may provide at least one of the channel selection information and the data output order information to the data driver with a cycle of one frame.

The image data may include frame data, and wherein the timing controller transmits frame protocol data for the frame data, and wherein the frame protocol data includes the channel selection information or the data output order information.

The data driver may change an output order of the first channel group and an output order of the second channel group in a vertical blank period between frame periods in which the frame data is transmitted.

The timing controller may provide the channel selection information or the data output order information to the data driver for each pixel row.

The image data may include line data corresponding to the pixel row, wherein the timing controller transmits line protocol data for the line data, and wherein the line protocol data for the line data includes the channel selection information or the data output order information.

The data driver may change an output order of the first channel group and an output order of the second channel group in a horizontal blank period between horizontal periods in which the line data are transmitted.

The display panel may further include first fan-out lines extending from a non-display area adjacent to the first display area through the first display area and connected to the pixels in the second display area, and wherein the second channel group is connected to the pixels in the second display area through the first fan-out lines.

The display panel may further include a third display area spaced apart from the second display area with the first display area interposed therebetween, wherein the channels further include a third channel group corresponding to the third display area, and wherein the data driver outputs third data signals in the second output order along the first direction through the third channel group, based on the channel selection information.

The display panel may further include second fan-out lines extending from a non-display area adjacent to the first display area through the first display area and connected to the pixels in the third display area, and wherein the third channel group is connected to the pixels in the third display area through the second fan-out lines.

According to an embodiment of the disclosure, a data driver includes: a plurality of channels arranged along a first direction, wherein the data driver is configured to output data signals corresponding to input data through the plurality of channels, wherein the channels include a first channel group and a second channel group, wherein the input data includes data values arranged in a first output order along the first direction, and wherein, based on channel selection information about the second channel group or the first channel group, the data driver outputs first data signals arranged in the first output order along the first direction through the first channel group, and outputs second data signals arranged in a second output order different from the first output order along the first direction through the second channel group.

The second output order may be a reverse order of the first output order.

The first channel group may include a first channel, a second channel, and a third channel sequentially arranged along the first direction, wherein the data driver outputs a first data signal to the first channel, a second data signal to the second channel, and a third data signal to the third channel according to the first output order, wherein the second channel group includes a fourth channel, a fifth channel, and a sixth channel sequentially arranged along the first direction, wherein the data driver outputs the third data signal to the fourth channel, the second data signal to the fifth channel, and the first data signal to the sixth channel according to the second output order, and wherein voltage ranges of the first, second, and third data signals are different from each other.

The channel selection information may include a first value indicating a first channel in the second channel group and a second value indicating a last channel in the second channel group.

The data driver may change an output order of the first data signals output through the first channel group based on data output order information.

According to an embodiment of the disclosure, a data driver includes: first, second, and third digital-to-analog converters each configured to generate a data signal using different gamma voltages; a plurality of channels, each of which is connected to one of the first, second, and third digital-to-analog converters and outputs the data signal provided from a corresponding digital-to-analog converter; and a switching unit connecting the first, second, and third digital-to-analog converters and the channels, wherein the channels include a first channel group and a second channel group, and wherein, based on channel selection information indicating the second channel group or the first channel group, the switching unit connects channels in the first channel group to the first, second and third digital-to-analog converters in a first output order and connects channels in the second channel group to the first, second and third digital-to-analog converters in a second output order different from the first output order.

The second output order may be a reverse order of the first output order.

The first channel group may include a first channel, a second channel, and a third channel sequentially arranged in a first direction, the switching unit connects the first channel to the first digital-to-analog converter, the second channel to the second digital-to-analog converter, and the third channel to the third digital-to-analog converter according to the first output order, the second channel group includes a fourth channel, a fifth channel, and a sixth channel sequentially arranged in the first direction, and the switching unit connects the fourth channel to the third digital-to-analog converter, the fifth channel to the second digital-to-analog converter, and the sixth channel to the first digital-to-analog converter, according to the second output order.

The switching unit may change a connection order between the channels in the first channel group and the first to third digital-to-analog converters to the second output order, and changes a connection order between the channels in the second channel group and the first to third digital-to-analog converters to the first output order, based on data output order information.

The data driver and the display device including the same according to embodiments of the disclosure may select some channels among the channels (or output channels) of the data driver based on the channel selection information (or channel selection register), and change an output order of the data signals output through the some channels based on the data output order information (or data output order register). Therefore, the pixels may normally receive data signals of a corresponding color and emit light with a desired luminance. In other words, deterioration of display quality of the display device may be prevented.

In addition, since the data driver may be implemented as one integrated circuit and may have a function of changing the output order of the data signals of the some channels, a manufacturing cost and a manufacturing time of the display device may be reduced compared to a case in which the data driver includes a plurality of integrated circuits.

Furthermore, since the display device may provide the channel selection information and the data output order information to the data driver by including the channel selection information and the data output order information in the frame protocol data or the line protocol data, the data driver may change the output order of the data signals in a frame unit or a line unit.

BRIEF DESCRIPTION OF THE DRAWINGS

The above and other features of the disclosure will become more apparent by describing in further detail embodiments thereof with reference to the accompanying drawings, in which:

FIG. 12 is a diagram illustrating an embodiment of a data output order change option provided to the data driver included in the display device of FIG. 1;

DETAILED DESCRIPTION OF THE EMBODIMENTS

Figure 1:
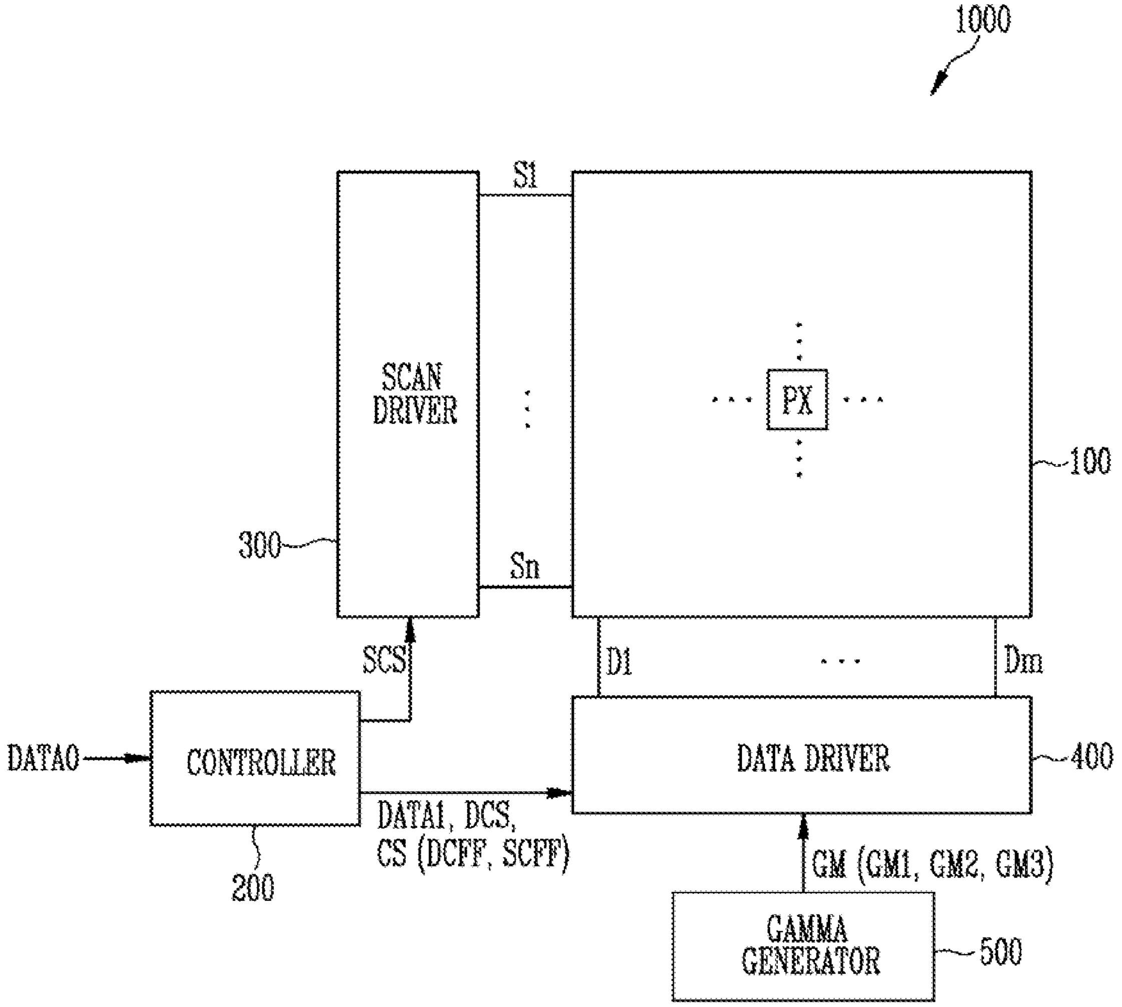
FIG. 1 is a block diagram illustrating a display device according to embodiments of the disclosure.

Hereinafter, embodiments of the disclosure are described in more detail with reference to the accompanying drawing. The same reference numerals may be used for the same components in the drawings, and repeated descriptions of the same components may be omitted.

Some embodiments of the disclosure are described in the accompanying drawings in relation to a functional block, unit and/or module. Those skilled in the art will understand that such block, unit, and/or module are/is physically implemented by a logic circuit, an individual component, a microprocessor, a hard wire circuit, a memory element, a line connection, and other electronic circuits. These elements may be formed using a semiconductor-based manufacturing technique or other manufacturing techniques. The block, unit, and/or module implemented by a microprocessor or other similar hardware may be programmed and controlled using software to perform various functions discussed herein. Optionally, the block, unit, and/or module implemented by a microprocessor or other similar hardware may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit and/or module may be physically separated into two or more individual blocks, units and/or modules that interact. In addition, in some embodiments, the block, unit and/or module may be physically combined into more complex blocks, units and/or modules.

Figure 2:
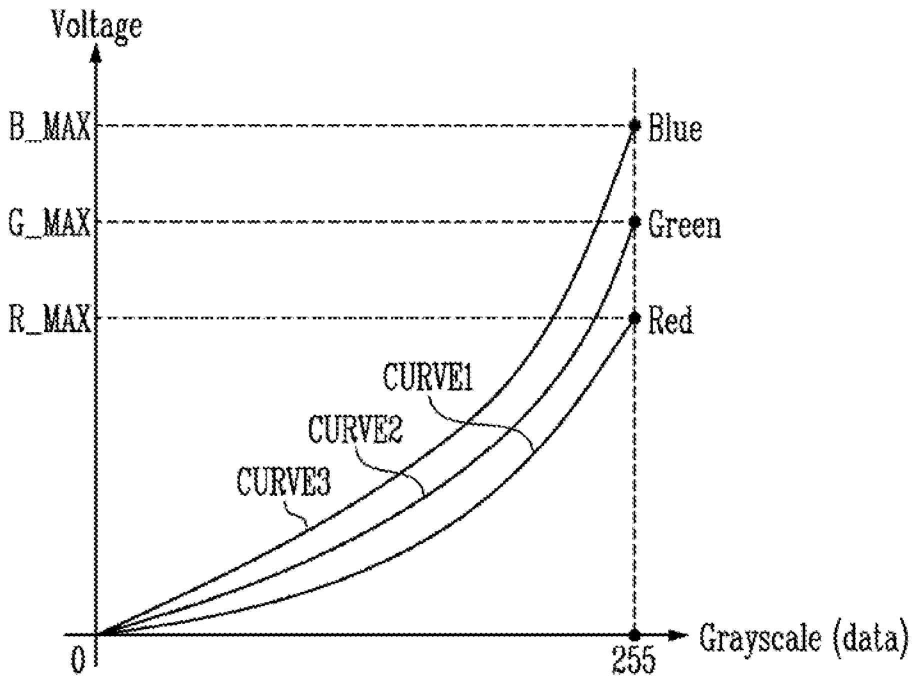
FIG. 2 is a diagram illustrating gamma sets generated by a gamma generator included in the display device of FIG. 1.

FIG. 1 is a block diagram illustrating a display device according to embodiments of the disclosure. FIG. 2 is a diagram illustrating gamma sets generated by a gamma generator included in the display device of FIG. 1.

First, referring to FIG. 1, the display device 1000 may include a display panel 100, a controller 200, a scan driver 300, and a data driver 400. The display device 1000 may further include a gamma generator 500 (or gamma voltage generator).

The display device 1000 may be implemented as a self-emission display device including a plurality of self-emission elements. For example, the display device 1000 may be an organic light emitting display device including organic light emitting elements, a display device including inorganic light emitting elements, or a display device including light emitting elements configured of an inorganic material and an organic material in combination. However, this is an example, and the display device 1000 may be implemented as a liquid crystal display device, a plasma display device, a quantum dot display device, or the like.

The display device 1000 may be a flat display device, a flexible display device, a curved display device, a foldable display device, a bendable display device, a slideable display device, or a stereoscopic display device (for example, a display device in which an image is displayed not only on a front surface but also on a side surface and/or a rear surface of the display device).

The display panel 100 may include scan lines S1 to Sn (where n is a positive integer), data lines D1 to Dm (where m is a positive integer), and pixels PX. The pixels PX may be electrically connected to the data lines D1 to Dm and the scan lines S1 to Sn, Pixels (or a pixel line) simultaneously controlled by one scan line and receiving data signals substantially simultaneously may be one pixel row. For example, pixels receiving a data signal based on a scan signal supplied to the first scan line S1 may be a first pixel row.

According to an embodiment of the disclosure, at least one scan line may be connected to each of the pixels PX. The pixels PX may also be connected to an emission control line.

The pixels PX may emit light with a grayscale and a luminance corresponding to the data signal supplied from the data lines D1 to Dm. Each of the pixels PX may include a driving transistor and at least one switching transistor. The pixel PX may include an organic light emitting element, an inorganic light emitting element, or a light emitting element configured of an organic material and an inorganic material in combination.

The controller 200 may function as a timing controller. In an embodiment of the disclosure, the controller 200 may generate a scan control signal SCS and a data control signal DCS based on clock signals and control signals supplied from the outside. The scan control signal SCS may be supplied to the scan driver 300, and the data control signal DCS may be supplied to the data driver 400. In addition, the controller 200 may rearrange input image data DATA0 supplied from the outside and supply the rearranged input image data DATA1 to the data driver 400.

The scan control signal SCS may include a scan start pulse and scan clock signals. The scan start pulse may control a first timing of the scan signal. The scan clock signals may be used to shift the scan start pulse.

The data control signal DCS may include a source start pulse and data clock signals (or data clock training signals). The source start pulse controls a sampling start time of the rearranged image data DATA1. The data clock signals are used to control a sampling operation.

The controller 200 may generate image data by rearranging the input image data DATA0 corresponding to an arrangement of the pixels PX in the display panel 100. For example, the controller 200 may arrange the input image data DATA0 in a first arrangement type in response to a first pixel arrangement (for example, a pixel arrangement of FIG. 3A) of the pixels PX. In the first arrangement type, a red-green-blue pattern may be repeated. As another example, the controller 200 may arrange the input image data DATA0 in a second arrangement type in response to a second pixel arrangement (for example, a pixel arrangement of FIG. 3B) of the pixels PX. In the second arrangement type, a red-green-blue-green pattern may be repeated.

In embodiments of the disclosure, the controller 200 may generate a control signal CS and provide the control signal CS to the data driver 400. For example, the controller 200 may be set based on a connection relationship (or a connection structure) between channels (or output channels) of the data driver 400 and the pixels PX in the display panel 100 and a driving method of the data driver 400. The connection relationship between the channels (or the output channels) of the data driver 400 and the pixels PX in the display panel 100 is described later with reference to FIG. 6 and the like, and the driving method of the data driver 400 is described later with reference to FIG. 15 and the like.

The control signal CS may include channel selection information SCFF (or a channel selection register) for selecting or indicating some channels (or channel groups) among the channels (or the output channels) of the data driver 400, and data output order information DCFF (or a data output order register) indicating an order in which the data signals are output from the some channels (and/or remaining channels) of the data driver 400. For example, when an order in which the some channels of the data driver 400 are connected to the pixels PX is different from an order in which the remaining channels are connected to the pixels PX, the control signal CS may include the channel selection information SCFF indicating the some channels of the data driver 400, and the data output order information DCFF indicating the order in which the data signals are output from the some channels (for example, an order different from the order in which the data signals are output from the remaining channels). In this case, the data driver 400 may output the data signals in a first output order corresponding to the pixel arrangement of the pixels PX through the remaining channels, and output the data signals in a second output order different from the first output order through the some channels. In other words, when a first group of channels is connected to a first group of pixels PX in a first order and a second group of channels is connected to a second group of pixels PX in a second order different from the first order, the data driver 400 outputs data signals in a first output order corresponding to the first group of pixels PX and a second output order corresponding to the second group of pixels PX. A content of changing an output order of the data signals is described later with reference to FIG. 4 and the like.

The scan driver 300 may supply a scan signal to the scan lines S1 to Sn corresponding to the pixel rows based on the scan control signal SCS. For example, the scan driver 300 may sequentially supply the scan signal to the scan lines S1 to Sn. When the scan signal is sequentially supplied, the pixels PX may be selected in a horizontal line unit (or a pixel row unit).

The data driver 400 may receive the data control signal DCS and the image data DATA1. The data driver 400 may supply analog data signals obtained by converting the image data DATA1 to the data lines D1 to Dm in response to the data control signal DCS. The data signals supplied to the data lines D1 to Dm may be supplied to the pixels PX selected by the scan signal. To accomplish this, the data driver 400 may supply the data signal to the data lines D1 to Dm to be synchronized with the scan signal.

The gamma generator 500 may provide gamma sets GM (or gamma voltage sets) respectively corresponding to a plurality of colors to the data driver 400.

In an embodiment of the disclosure, the gamma generator 500 may provide a first gamma set GM1 corresponding to a first color, a second gamma set GM2 corresponding to a second color, and a third gamma set GM3 corresponding to a third color to the data driver 400. For example, the first color may be red, the second color may be green, and the third color may be blue.

Referring to FIG. 2, grayscale values of each data included in the image data DATA1 may be expressed as 0 to 255 grayscales. The first gamma set GM1 may include information on gamma voltages (or grayscale voltages) corresponding to grayscale values of red data. For example, the gamma voltages of the first gamma set GM1 may be positioned on a first gamma curve CURVE1. The second gamma set GM2 may include information on gamma voltages (or grayscale voltages) corresponding to grayscale values of green data. For example, the gamma voltages of the second gamma set GM2 may be positioned on a second gamma curve CURVE2. The third gamma set GM3 may include information on gamma voltages (or grayscale voltages) corresponding to grayscale values of blue data. For example, the gamma voltages of the third gamma set GM3 may be positioned on the third gamma curve CURVE3. As shown in FIG. 2, a voltage range of the first gamma set GM1, a voltage range of the second gamma set GM2, and a voltage range of the third gamma set GM3 may be different from each other. For example, a first maximum gamma voltage R_MAX of the first gamma set GM1, a second maximum gamma voltage G_MAX of the second gamma set GM2, and a third maximum gamma voltage B_MAX of the third gamma set GM3 respectively corresponding to 255 grayscales may be different from each other. For example, the second maximum gamma voltage G_MAX may be greater than the first maximum gamma voltage R_MAX and less than the third maximum gamma voltage B_MAX.

The data driver 400 may convert the grayscale values included in the image data DATA1 into the data signals that are analog gamma voltages based on the first to third gamma sets GM1, GM2, and GM3.

Since the first to third gamma curves CURVE1 to CURVE3 are different according to red, green, and blue, voltages of the output data signals may be different even though a grayscale is the same. For example, in a case in which all of the red data, the green data, and the blue data are 255 grayscales, the voltages of the data signals output corresponding to this case may be different from each other. For example, when the third gamma set GM3 of blue is applied to image data of a red pixel, an image luminance may be unintentionally changed and image quality may be deteriorated.

Therefore, an applied gamma set is required to be differently controlled according to an arrangement type of the image data DATA1. The data driver 400 may control the application of the gamma sets GM based on the channel selection information SCFF and the data output order information DCFF, or control the output order of the data signals to which the gamma sets GM are differently applied. For example, the data driver 400 may apply the first gamma set GM1 to the image data of the red pixel. For example, the data driver 400 may control the output order of the data signals so that the data signal to which the first gamma set GM1 is applied is supplied to the red pixel, in other words, the data signal is output through a channel connected to the red pixel.

In an embodiment of the disclosure, at least some functions of the controller 200, the data driver 400, and the gamma generator 500 may be integrated into one driving circuit. For example, the driving circuit may be provided in a form of an integrated circuit that performs functions of the controller 200, the data driver 400, and the gamma generator 500.

As described above, in response to the control signal CS (in other words, the channel selection information SCFF and the data output order information DCFF), the data driver 400 may output the data signals in the second output order through the some channels, and output the data signals in the first output order through the remaining channels. In other words, the data driver 400 may output the data signals in the first output order through the first group of channels, and output the data signals in the second output order through the second group of channels. Therefore, the pixels PX may receive data signals of a corresponding color (or to which a corresponding gamma curve is applied), and deterioration of image quality may be prevented.

Figure 3A:
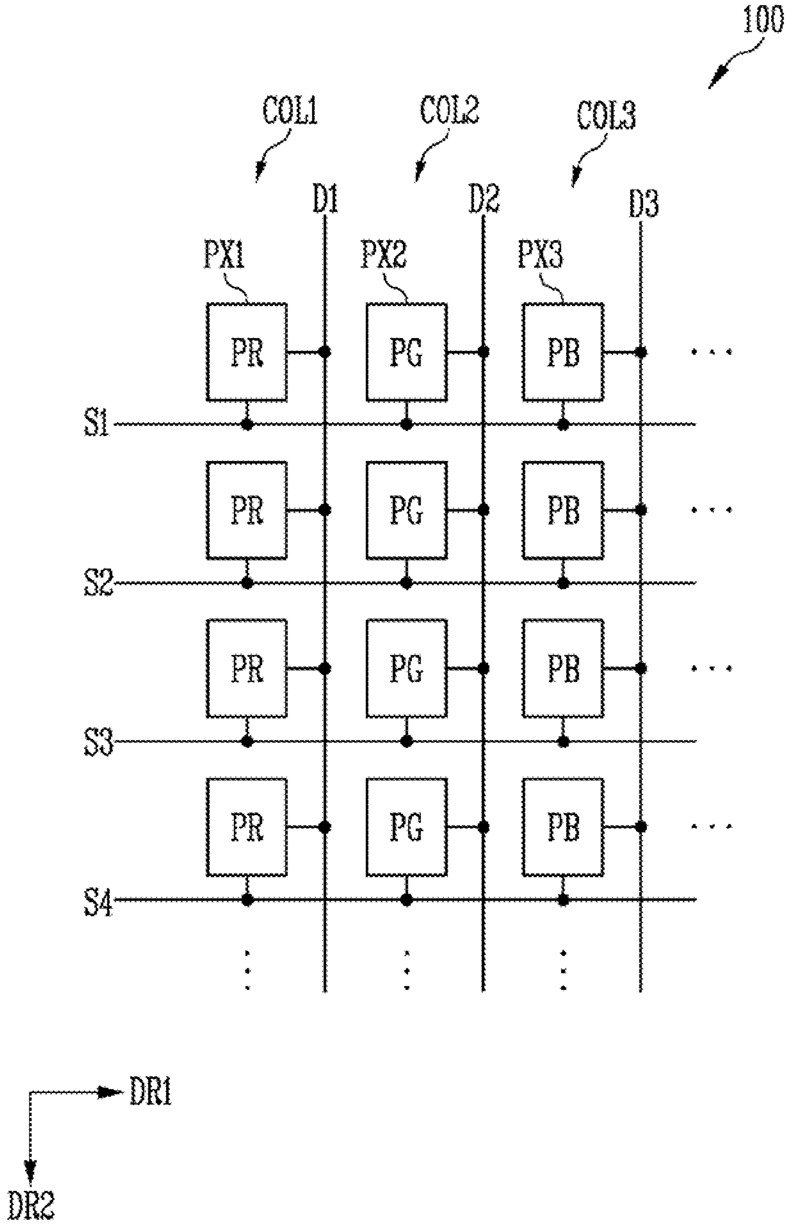
FIGS. 3A and 3B are diagrams illustrating embodiments of a display panel included in the display device of FIG. 1.
Figure 3B:
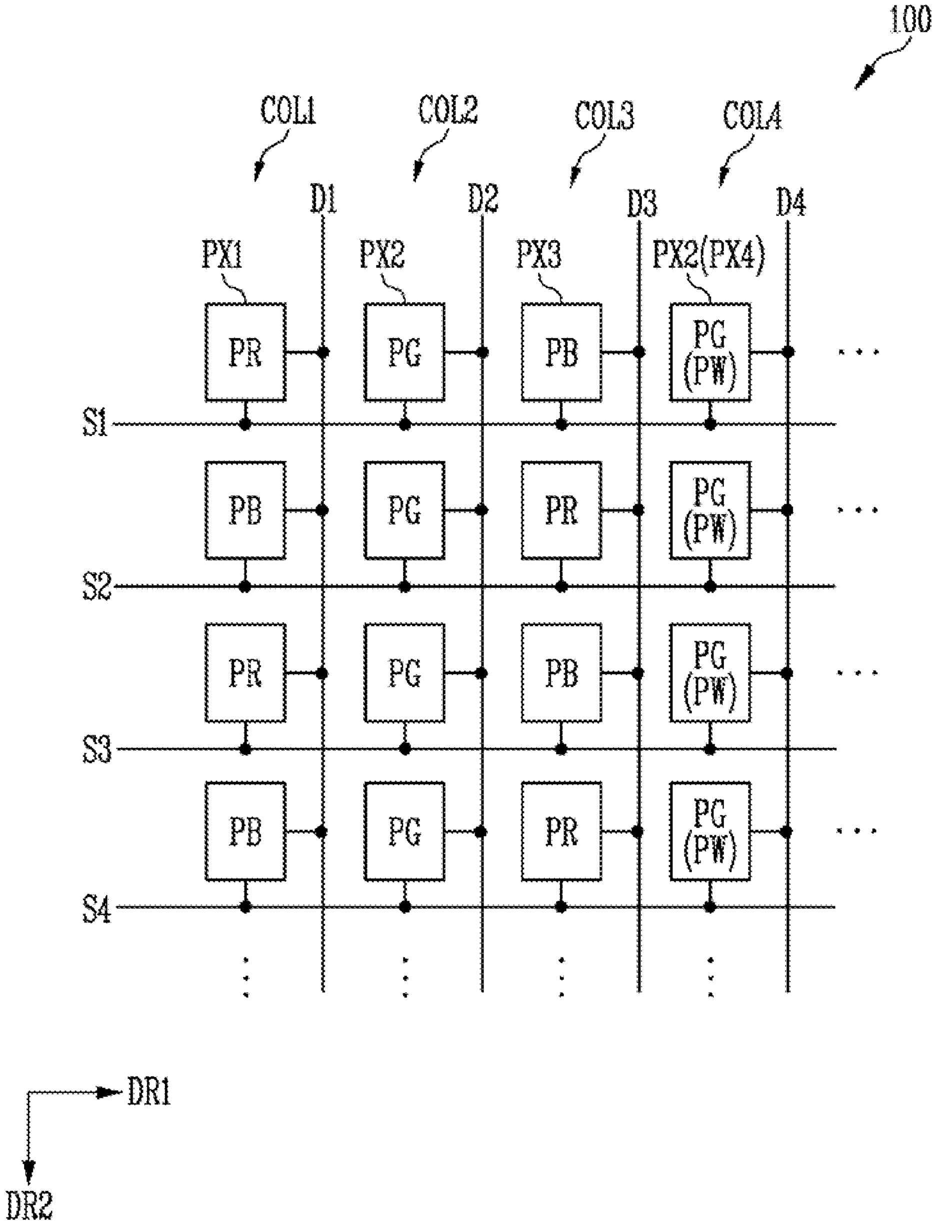

FIGS. 3A and 3B are diagrams illustrating embodiments of the display panel included in the display device of FIG. 1.

Referring to FIGS. 3A and 3B, the display panel 100 may include a plurality of pixels PX1, PX2, and PX3, and scan lines S1, S2, S3 and S4 and data lines D1, D2, D3 and D4 connected to the pixels PX1, PX2, and PX3.

FIGS. 3A and 3B show a portion of the display panel 100, and each of scan line S1 and data line D1 is not limited to a first signal line of all scan lines and data lines. For example, first to fourth scan lines S1 to S4 may be understood as scan lines corresponding to consecutive pixel rows, and first to fourth data lines D1 to D4 may be understood as data lines corresponding to consecutive pixel columns.

The pixels PX1 to PX3 may include a first pixel PX1 (or a first color pixel), a second pixel PX2 (or a second color pixel), and a third pixel PX3 (or a third color pixel). The first pixel PX1, the second pixel PX2, and the third pixel PX3 may emit light in a first color, a second color, and a third color, respectively. In an embodiment of the disclosure, the first color, the second color, and the third color are different colors from each other, respectively, and may be one of red, green, and blue.

For example, as shown in FIG. 3A, in a first pixel row controlled by the first scan line S1, the first to third pixels PM1, PX2, and PX3 may be arranged in a first direction DR1 in an order of a red pixel PR, a green pixel PG, and a blue pixel PB. A pixel arrangement of the first pixel row may be repeated in a second direction DR2 (for example, a stripe pixel structure). For example, a first pixel column COL1 may include the red pixel PR, a second pixel column COL2 may include the green pixel PG, and the third pixel column COLS may include the blue pixel PB.

For example, as shown in FIG. 3B, in the first pixel row (and odd-numbered pixel rows) controlled by the first scan line S1, the first to third pixels PX1, PX2, and PX3 may be arranged in the first direction DR1 in an order of the red pixel PR, the green pixel PG, the blue pixel PB, and the green pixel PG. In a second pixel row (and even-numbered pixel rows) controlled by the second scan line S2, the first to third pixels PX1, PX2, and PX3 may be arranged in the first direction DR1 in an order of the blue pixel PB, the green pixel PG, the red pixel PR, and the green pixel PG.

The pixel arrangement of the first pixel row and the pixel arrangement of the second pixel row may be alternately repeated in the second direction DR2 (for example, a PENTILE™ pixel structure). For example, the first pixel column COL1 and the third pixel column COL3 (or an odd-numbered pixel column) may include the red pixel PR and the blue pixel PB, and the second pixel column COL2 and a fourth pixel column COLA (or an even-numbered pixel column) may include the green pixel PG. However, this is an example, and the arrangement of the pixels is not limited thereto.

In an embodiment of the disclosure, the first to third pixels PX1 to PX3 may further include a fourth pixel PX4. The fourth pixel PX4 may emit light in a fourth color, and for example, the fourth color may be white.

For example, as shown in FIG. 33, in the first pixel row controlled by the first scan line S1, the first to fourth pixels PX1, PX2, PX3, and PX4 may be arranged in the direction DR1 in an order of the red pixel PR, the green pixel PG, the blue pixel PB and a white pixel PW. The pixel arrangement of the first pixel row may be repeated in the second direction DR2 (for example, a RGBW stripe pixel structure).

Figure 4:
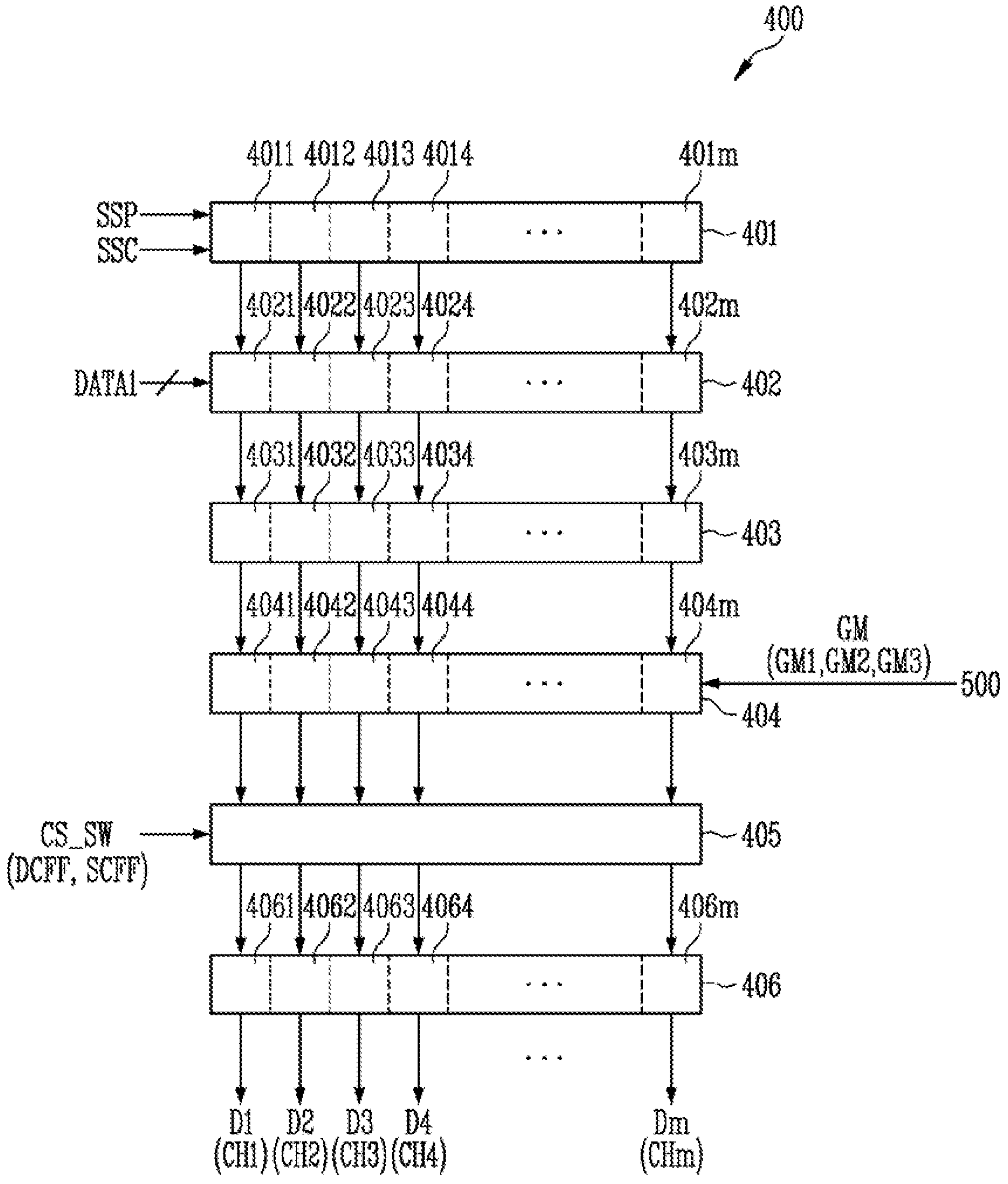
FIG. 4 is a diagram illustrating an embodiment of a data driver included in the display device of FIG. 1.

FIG. 4 is a diagram illustrating an embodiment of the data driver included in the display device of FIG. 1. FIGS. 5A to 5D are diagrams illustrating an operation of a switch unit included in the data driver of FIG. 4.

First, referring to FIGS. 1 and 4, the data driver 400 may include a shift register unit 401, a sampling latch unit 402, a holding latch unit 403, a signal generation unit 404, a switching unit 405, and an output buffer unit 406.

The shift register unit 401 receives a source start pulse SSP and a source shift clock SSC. Here, the source shift clock SSC may be included in the data clock signals described with reference to FIG. 1 or may be generated by the data driver 400 (for example, a clock data recovery circuit) based on the data clock training signals.

The shift register unit 401 may sequentially generate m sampling signals while shifting the source start pulse SSP for one period of the source shift clock SSC. The shift register unit 401 may include m shift registers 4011 to 401*m*.

The sampling latch unit 402 may sequentially store the image data DATA1 in response to the sampling signals sequentially supplied from the shift register unit 401. The sampling latch unit 402 may include m sampling latches 4021 to 402*m* for storing m data (or grayscale values).

The holding latch unit 403 may receive data from the sampling latch unit 402 and store the data. The holding latch unit 403 may provide pre-stored data to the signal generation unit 404. The holding latch unit 403 may include m holding latches 4031 to 403*m*.

The signal generation unit 404 receives the data from the holding latch unit 403 and generates the data signal in response to the data. The signal generation unit 404 may include m digital-to-analog converters 4041 to 404*m*. Each of the digital-to-analog converters 4041 to 404*m* may select a gamma voltage based on corresponding data (or grayscale value) and output the selected gamma voltage as the data signal. The gamma voltage may be included in a corresponding gamma set among the first to third gamma sets GM1, GM2, and GM3.

Figure 5A:
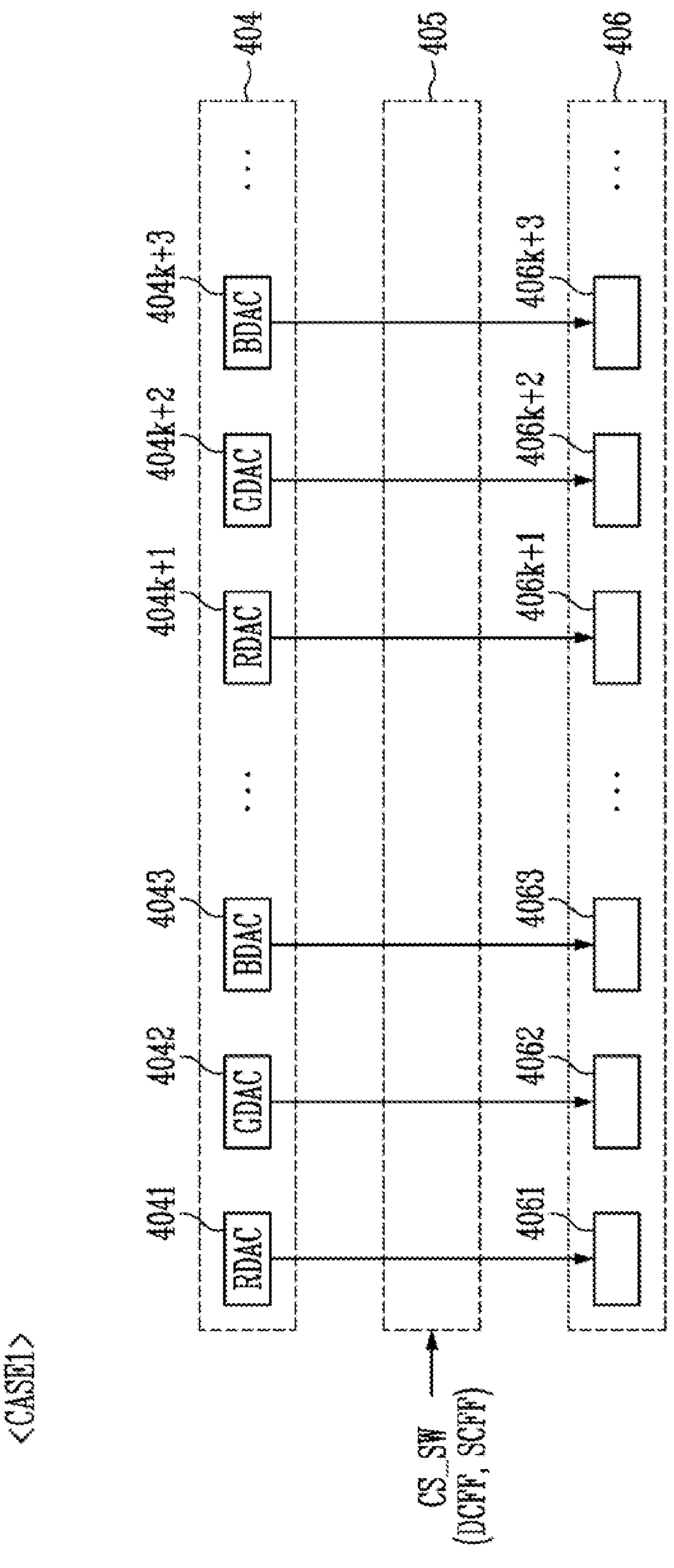
FIGS. 5A, 5B, 5C and 5D are diagrams illustrating an operation of a switch unit included in the data driver of FIG. 4.

Referring to FIG. 5A, for example, a first digital-to-analog converter 4041 (and a (k+1)-th digital-to-analog converter 404*k*+1, where k is an integer greater than 3 and less than m) may use the first gamma set GM1, and may be referred to as a first color digital-to-analog converter RDAC. In this case, the first color digital-to-analog converter RDAC may generate a red data signal (a first data signal, or a first data voltage) corresponding to the red data.

For example, a second digital-to-analog converter 4042 (and a (k+2)-th digital-to-analog converter 404*k*+2) may use the second gamma set GM2, and may be referred to as a second color digital-to-analog converter GDAC. In this case, the second color digital-to-analog converter GDAC may generate a green data signal (a second data signal, or a second data voltage) corresponding to the green data.

For example, a third digital-to-analog converter 4043 (and a (k+3)-th digital-to-analog converter 404*k*+3) may use the third gamma set GM3, and may be referred to as a third color digital-to-analog converter BDAC. In this case, the third color digital-to-analog converter BDAC may generate a blue data signal (a third data signal, or a third data voltage) corresponding to the blue data.

The switching unit 405 may transmit the data signals supplied from the signal generation unit 404 to the output buffer unit 406. In addition, the switching unit 405 may change a connection order between the signal generation unit 404 and the output buffer unit 406 or change a transmission order (or an output order) of the data signals provided from the signal generation unit 404 to the output buffer 406, in response to the control signal CS (or a switching control signal corresponding to the control signal CS).

A configuration in which the switching unit 405 changes the connection order between the signal generation unit 404 and the output buffering unit 406 in response to the control signal CS is described later with reference to FIGS. 5A to 5D after the output buffer unit 406 is described.

The output buffer unit 406 may transmit the data signals (or the data voltages) provided from the switching unit 405 to the data lines D1 to Dm. The output buffer unit 406 may include m source buffers 4061 to 406*m* (source amplifiers, or output buffers) respectively connected to the data lines D1 to Dm. The source buffers 4061 to 406*m* may configure m channels CH1 to CHm, respectively, or may be referred to as the channels CH1 to CHm.

Referring to FIG. 5A, in a first case CASE1, the data output order information DCFF may have a value corresponding to an order of red-green-blue (or the first output order), and the channel selection information SCFF may not include a value for selecting specific channels. In this case, the switching unit 405 may transmit the data signals provided from the signal generating unit 404 to the output buffer unit 406 as they are (in other words, without changing an order) with respect to all channels.

For example, the switching unit 405 may connect the first digital-to-analog converter 4041, in other words, is the first color digital-to-analog converter RDAC to a first source buffer 4061. In this case, the first source buffer 4061 (or a first channel) may output the red data signal. In addition, the switching unit 405 may connect the second digital-to-analog converter 4042, in other words, the second color digital-to-analog converter GDAC to a second source buffer 4062. In this case, the second source buffer 4062 (or a second channel) may output the green data signal. In addition, the switching unit 405 may connect the third digital-to-analog converter 4043, in other words, the third color digital-to-analog converter BDAC to a third source buffer 4063. In this case, the third source buffer 4063 (or a third channel) may output the blue data signal. Similarly, the switching unit 405 may connect the (k+1)-th, (k+2)-th, and (k+3)-th digital-to-analog converters 404*k*+1, 404*k*+2, and 404*k*+3 to (k+1)-th, (k+2)-th, and (k+3)-th source buffers 406*k*+1, 406*k*+2, and 406*k*+3, respectively, and the (k+1)-th, (k+2)-th, and (k+3)-th source buffers 406*k*+1, 406*k*+2, and 406*k*+3 (or (k+1)-th, (k+2)-th, and (k+3)-th channels) may output the red, green, and blue data signals, respectively. In other words, the data signals may be output in the order of red-green-blue through all channels.

Figure 5B:
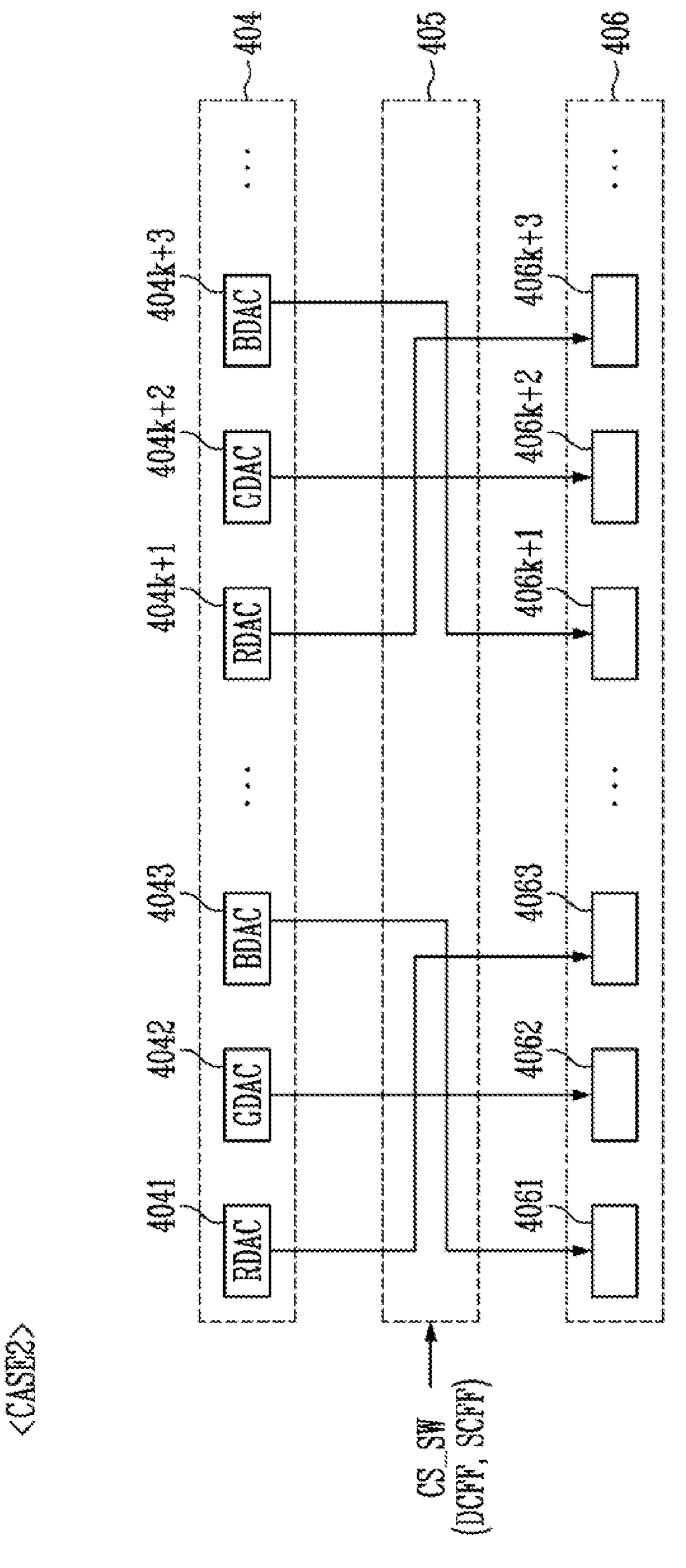

Referring to FIG. 5B, in a second case CASE2, the data output order information DCFF may have a value corresponding to an order of blue-green-red (or the second output order), and the channel selection information SCFF may not include a value for selecting specific channels. In this case, the switching unit 405 may change the order of the data signals provided from the signal generating unit 404 and transmit the data signals to the output buffer unit 406 with respect to all channels.

For example, the switching unit 405 may connect the first digital-to-analog converter 4041, in other words, the first color digital-to-analog converter RDAC to the third source buffer 4063. In this case, the third source buffer 4063 (or the third channel) may output the red data signal, rather than the blue data signal as shown in FIG. 5A. In addition, the switching unit 405 may connect the third digital-to-analog converter 4043, in other words, the third color digital-to-analog converter BDAC to the first source buffer 4061. In this case, the first source buffer 4061 (or the first channel) may output the blue data signal, rather than the red data signal as shown in FIG. 5A. Similarly, the switching unit 405 may connect the (k+1)-th and (k+3)-th digital-to-analog converters 404*k*+1 and 404*k*+3 to the (k+3)-th and (k+1)-th source buffers 406*k*+3 and 406*k*+1, respectively, and the (k+1)-th, (k+2)-th, and (k+3)-th source buffers 406*k*+1, 406*k*+2, and 406*k*+3 (or the (k+1)-th, (k+2)-th, and (k+3)-th channels) may output the blue, green, and red data signals, respectively. In other words, the data signals may be output in the order of blue-green-red through all channels.

Figure 5C:
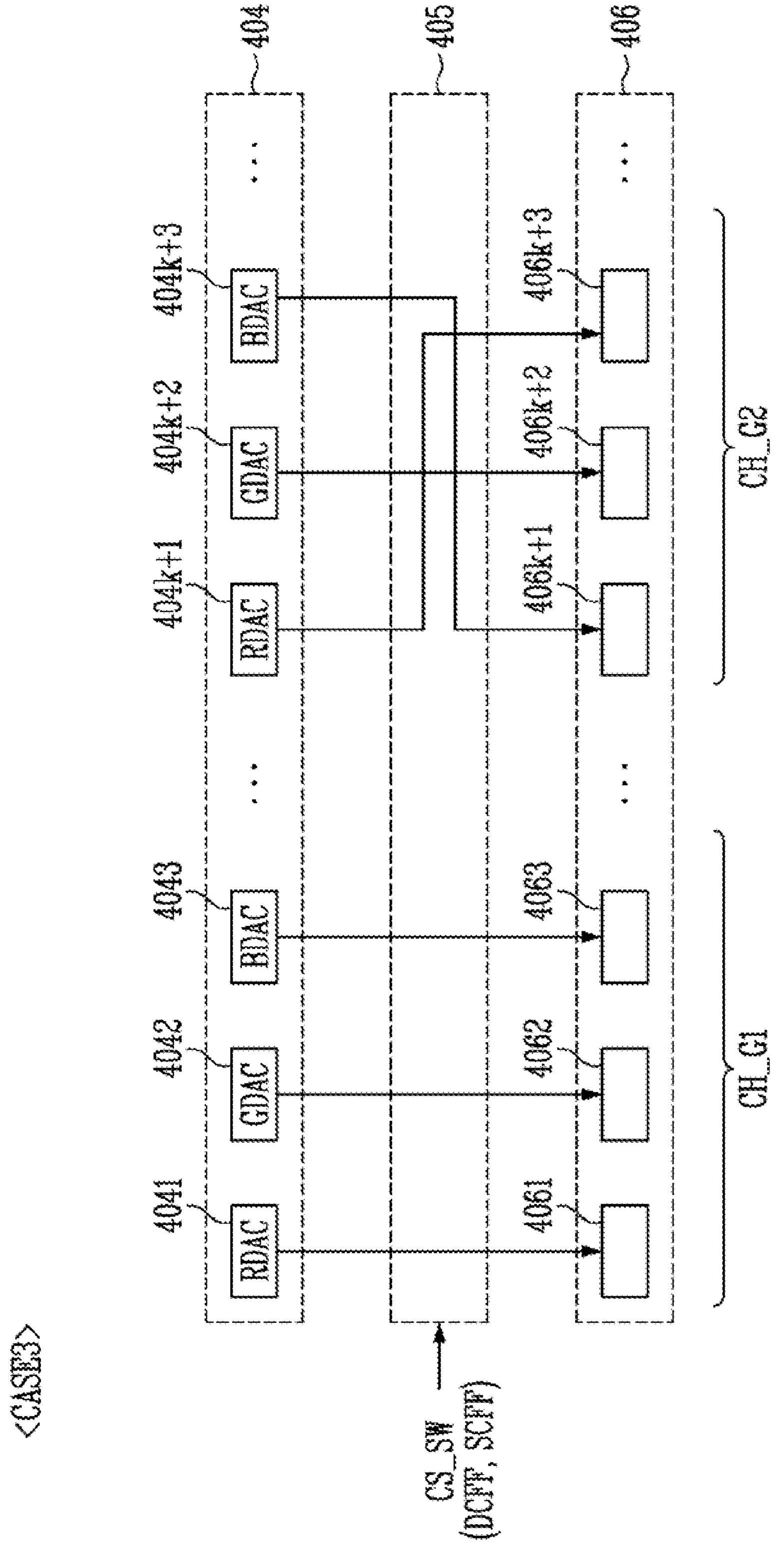

Referring to FIG. 5C, in a third case CASE3, the data output order information DCFF may have a value corresponding to the order of red-green-blue, and the channel selection information SCFF may include a value for selecting a second channel group CH_G2. In this case, the switching unit 405 may transmit the data signals provided from the signal generator 404 to the output buffer unit 460 as they are with respect to a first channel group CH_G1, and may change the order of the data signals provided from the signal generation unit 404 and transmit the data signals to the output buffer unit 406 with respect to the second channel group CH_G2.

For example, the switching unit 405 may connect the first, second, and third digital-to-analog converters 4041, 4042, and 4043 corresponding to the first channel group CH_G1 to the first, second, and third source buffers 4061, 4062, and 4063, respectively, and the first, second, and third source buffers 4061, 4062, and 4063 (or the first, second, and third channels) may output the red, green, and blue data signals, respectively. In other words, the data signals may be output in the order of red-green-blue through the channels included in the first channel group CH_G1. In addition, the switching unit 405 may connect the (k+1)-th, (k+2)-th, and (k+3)-th digital-to-analog converters 404*k*+1, 404*k*+2, and 404*k*+3 to the (k+3)-th, (k+2)-th, and (k+1)-th source buffers 406*k*+3, 406*k*+2, and 406*k*+1, respectively, and the (k+3)-th, (k+2)-th, and (k+1)-th source buffers 406*k*+3, 406*k*+2, and 406*k*+1 (or the (k+1)-th, (k+2)-th, and (k+3)-th channels) may output the blue, green, and red data signals, respectively. In other words, the data signals may be output in the order of blue-green-red through the channels included in the second channel group CH_G2.

Figure 5D:
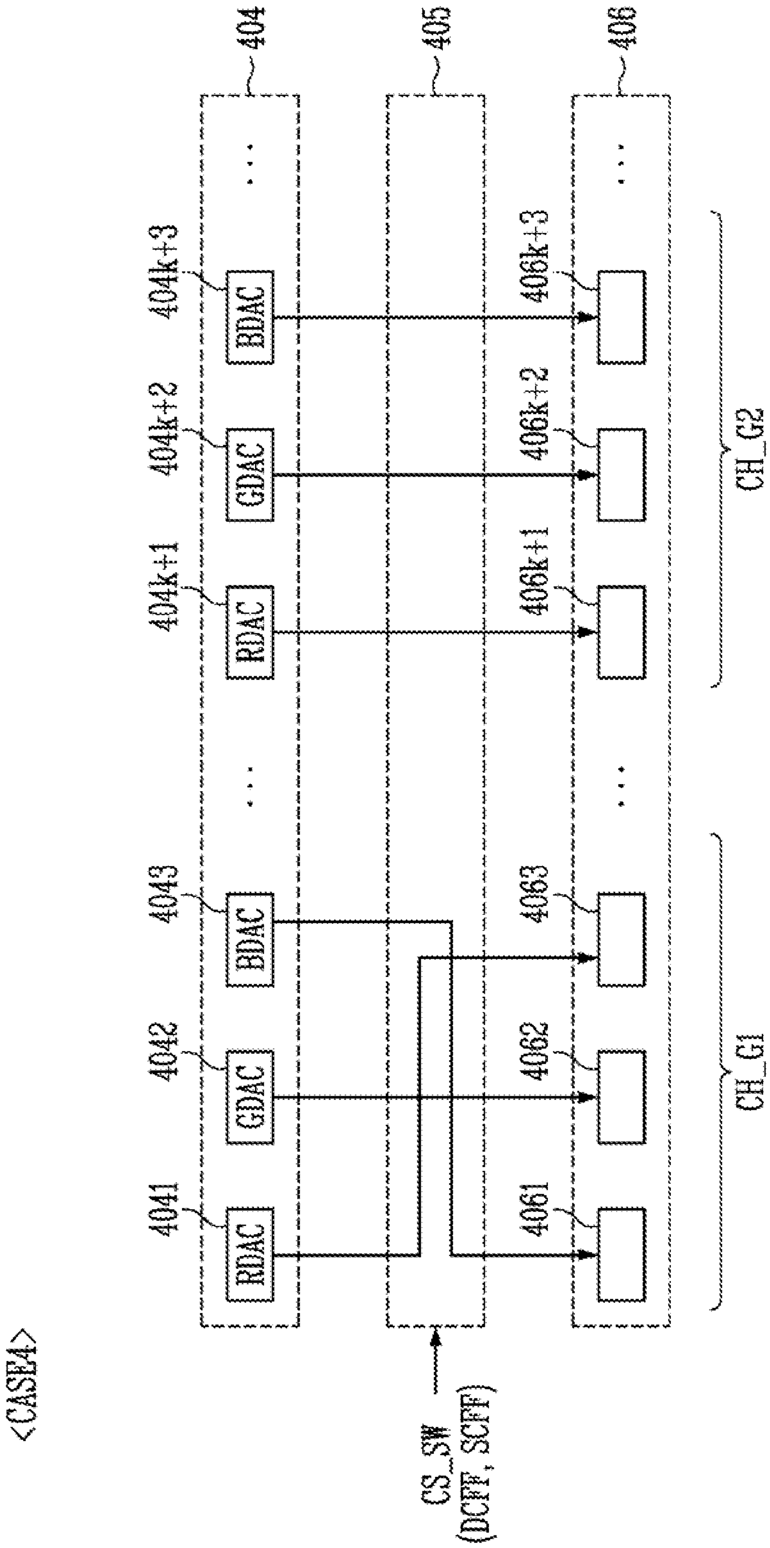

Referring to FIG. 5D, in a fourth case CASE4, the data output order information DCFF may have a value corresponding to the order of blue-green-red, and the channel selection information SCFF may have a value for selecting the first channel group CH_G1. In this case, the switching unit 405 may change the order of the data signals provided from the signal generating unit 404 and transmit the data signals to the output buffer unit 406 with respect to the first channel group CH_G1 according to the order of blue-green-red. In addition, the switching unit 405 may transmit the data signals provided from the signal generating unit 404 to the output buffer unit 406 as they are with respect to the second channel group CH_G2.

For example, the switching unit 405 may connect the first, second, and third digital-to-analog converters 4041, 4042, and 4043 corresponding to the first channel group CH_G1 to the third, second, and first source buffers 4063, 4062, and 4061, respectively, and the first, second, and third source buffers 4061, 4062, and 4063 (or the first, second, and third channels) may output the blue, green, and red data signals, respectively. In other words, the data signals may be output in the order of blue-green-red through the channels included in the first channel group CH_G1. In addition, the switching unit 405 may connect the (k+1)-th, (k+2)-th, and (k+3)-th digital-to-analog converters 404*k*+1, 404*k*+2, and 404*k*+3 to the (k+1)-th, (k+2)-th, and (k+3)-th source buffers 406*k*+1, 406*k*+2, and 406*k*+3, respectively, and the (k+1)-th, (k+2)-th, and (k+3)-th source buffers 406*k*+1, 406*k*+2, and 406*k*+3 (or the (k+1)-th, (k+2)-th, and (k+3)-th channels) may output the red, green, and blue data signals, respectively. In other words, the data signals may be output in the order of red-green-blue through the channels included in the second channel group CH_G2.

In the fourth case CASE4, the data output order information DCFF has the value corresponding to the order of blue-green-red, and the channel selection information SCFF has the value for selecting the first channel group CH_G1, but the disclosure is not limited thereto. For example, also in a case in which the data output order information DCFF has the value corresponding to the order of red-green-blue and the channel selection information SCFF has the value for selecting the first channel group CH_G2, the switching unit 405 may operate as shown in FIG. 5D.

Figure 6:
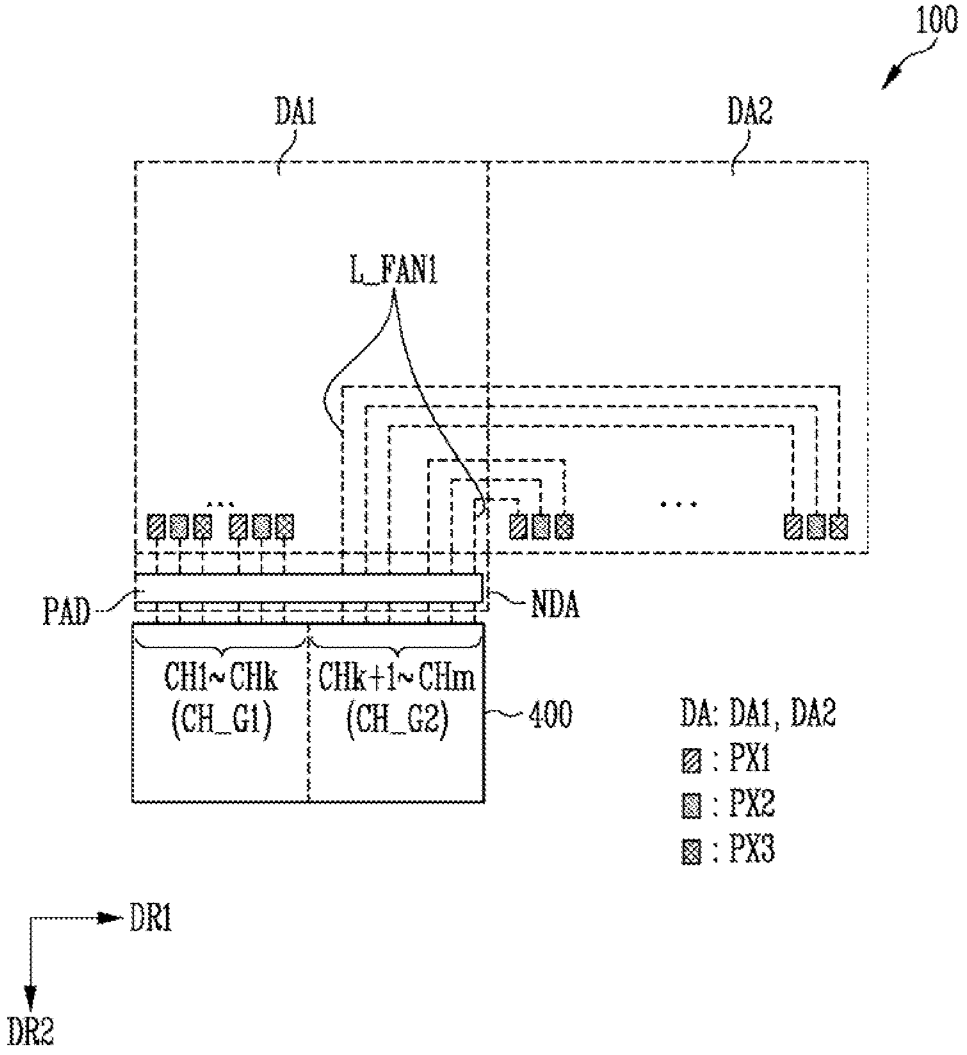
FIG. 6 is a diagram illustrating an embodiment of the display device of FIG. 1.
Figure 7:
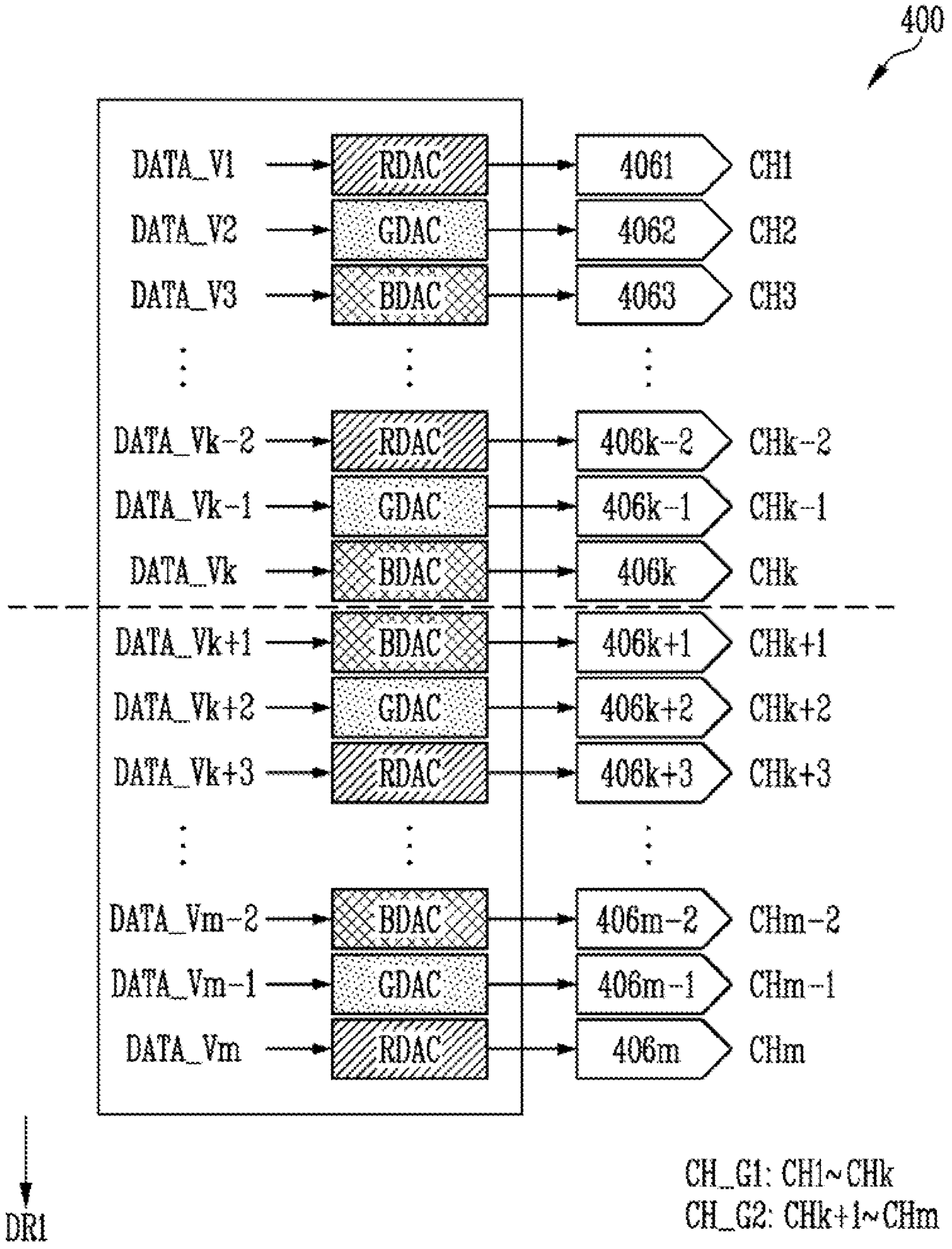
FIG. 7 is a diagram illustrating an operation of a data driver included in the display device of FIG. 6.

As described above, the data driver 400 may variously change the output order of the data signals output through at least some of the channels based on the control signal CS (in other words, the data output order information DCFF and the channel selection information SCFF), FIG. 6 is a diagram illustrating an embodiment of the display device of FIG. 1. In FIG. 6, the display device 1000 is briefly shown based on the display panel 100 and the data driver 400. In addition, in FIG. 6, the display panel 100 includes the pixels PX1, PX2, and PX3 arranged in the pixel arrangement (or the first pixel arrangement) of FIG. 3A, but this is an example, and the pixel arrangement of the pixels PX1, PX2, and PX3 in the display panel 100 is not limited thereto. For example, the display panel 100 may include the pixels PX1, PX2, and PX3 arranged in the pixel arrangement (or the second pixel arrangement) of FIG. 3B. FIG. 7 is a diagram illustrating an operation of the data driver included in the display device of FIG. 6. In FIG. 7, the data driver 400 is briefly shown based on the output buffer unit 406 described with reference to FIG. 4. In addition, to describe the data signals output through the output buffer unit 406, the signal generation unit 404 described with reference to FIG. 4 is further shown in FIG. 7.

First, referring to FIGS. 1 and 6, the display panel 100 may include a display area DA and a non-display area NDA. The pixels PX1, PX2, and PX3 may be disposed in the display area DA. The data driver 400 may be mounted or connected to the non-display area NDA. Pads PAD for connection to the data driver 400 may be disposed in the non-display area NDA.

The display area DA may include a first display area DA1 and a second display area DA2. For example, the second display area DA2 may be positioned in the first direction DR1 with respect to the first display area DA1. The non-display area NDA may be positioned in the second direction DR2 with respect to the first display area DA1. However, this is an example, and a disposition relationship of the first display area DA1, the second display area DA2, and the non-display area NDA is not limited thereto. For example, the second display area DA2 may be positioned in a direction opposite to the first direction DR1 with respect to the first display area DA1, or the non-display area NDA may be positioned in a direction opposite to the second direction DR2 with respect to the first area DA1.

The data driver 400 may be implemented as one integrated circuit (for example, one driver IC).

The first to k-th channels CH1 to CHk included in the first channel group CH_G1 of the data driver 400 may be connected to the pixels PX1, PX2, and PX3 in the first display area DA1. The first to k-th channels CH1 to CHk in the first channel group CH_G1 of the data driver 400 may be sequentially connected to the pixels PX1, PX2, and PX3 (or pixel columns) in the first display area DA1 along the first direction DR1. For example, the first channel CH1 may be connected to a first pixel (for example, the first pixel PX1, the red pixel, or the first pixel column) in the first display area DA1, and the k-th channel CHk may be connected to a last pixel (for example, the third pixel PX3, the blue pixel, or a last pixel column) in the first display area DA1.

The first to k-th channels CH1 to CHk in the first channel group CH_G1 of the data driver 400 may output the data signals in the first output order, in response to the pixel arrangement (or the first pixel arrangement) of the pixels PX1, PX2, and PX3.

For example, as shown in FIG. 7, the first source buffer 4061 configuring the first channel CH1 may be connected to the first color digital-to-analog converter RDAC, and may output the red data signal corresponding to a first data value DATA_V1. The second source buffer 4062 configuring the second channel CH2 may be connected to the second color digital-to-analog converter GDAC, and may output the green data signal corresponding to a second data value DATA_V2. The third source buffer 4063 configuring the third channel CH3 may be connected to the third color digital-to-analog converter BDAC, and may output a blue data signal corresponding to a third data value DATA_V3. Similarly, the (k−2)-th source buffer 406*k*-2 configuring the (k−2)-th channel CHk−2 may be connected to the first color digital-to-analog converter RDAC, and may output the red data signal corresponding to a (k−2)-th data value DATA_Vk−2. The (k−1)-th source buffer 406*k*-1 configuring the (k−1)-th channel CHk−1 may be connected to the second color digital-to-analog converter GDAC, and may output the green data signal corresponding to a (k−1)-th data value DATA_Vk−1. The k-th source buffer 406*k* configuring the k-th channel CHk may be connected to the third color digital-to-analog converter BDAC, and may output the blue data signal corresponding to a k-th data value DATA_Vk.

In other words, the first to k-th channels CH1 to CHk in the first channel group CH_G1 of the data driver 400 may output the data signals in the order of red-green-blue along the first direction DR1.

In an embodiment of the disclosure, the display panel 100 may include first fan-out lines L_FAN1. The first fan-out lines L_FAN1 may extend from the non-display area NDA to the second display area DA2 via the first display area DA1 and may connect the (k+1)-th to m-th channels CHk+1 to CHm included in the second channel group CH_G2 of the data driver 400 to the pixels PX1, PX2, and PX3 in the second display area DA2.

The first fan-out lines L_FAN1 may not overlap each other. In this case, the (k+1)-th to m-th channels CHk+1 to CHm in the second channel group CH_G2 may be connected to the pixels PX1, PX2, and PX3 in the display area DA2 in a reverse sequential order along the first direction DR1. For example, the m-th channel CHm may be connected to the first pixel (for example, the first pixel PX1, the red pixel, or the first pixel column) closest to the first display area DA1, and the (k+1)-th channel CHk+1 may be connected to the last pixel (for example, the third pixel PX3, the blue pixel, or the last pixel column) farthest from the first display area DA1.

The (k+1)-th to m-th channels CHk+1 to CHm in the second channel group CH_2 of the data driver 400 may output the data signals in the second output order, according to a connection order with the first to third pixels PX1, PX2, and PX3 in the second display area DA2. The second output order may be a reverse (or a reverse order) of the first output order.

For example, as shown in FIG. 7, the (k+1)-th source buffer 406*k*+1 configuring the (k+1)-th channel CHk+1 may be connected to the third color digital-to-analog converter BDAC, and may output the blue data signal corresponding to a (k+1)-th data value DATA_Vk+1. The (k+2)-th source buffer 406*k*+2 configuring the (k+2)-th channel (CHk+2) may be connected to the second color digital-to-analog converter GDAC, and may output the green data signal corresponding to a (k+2)-th data value DATA_Vk+2. The (k+3)-th source buffer 406*k*+3 configuring the (k+3)-th channel (CHk+3) may be connected to the first color digital-to-analog converter RDAC, and may output the red data signal corresponding to a (k+3)-th data value DATA_Vk+3. Similarly, the (m−2)-th source buffer 406*m*−2 configuring the (m−2)-th channel CHm−2 may be connected to the third color digital-to-analog converter BDAC, and may output the blue data signal corresponding to an (m−2)-th data value DATA_Vm−2 The (m−1)-th source buffer 406*m*−1 configuring the (m−1)-th channel CHm−1 may be connected to the second color digital-to-analog converter GDAC, and may output the green data signal corresponding to an (m−1)-th data value DATA_Vm−1. The m-th source buffer 406*m* configuring the m-th channel CHm may be connected to the first color digital-to-analog converter RDAC, and may output the red data signal corresponding to an m-th data value DATA_Vm.

In other words, the (k+1) to m-th channels CHk+1 to CHm in the second channel group CH_G2 of the data driver 400 may output the data signals in the order of blue-green-red along the first direction DR1. Therefore, each of the first to third pixels PX1, PX2, and PX3 disposed in the second display area DA2 may normally receive a data signal of a corresponding color.

As described above, some channels (for example, the second channel group CH_G2) of the data driver 400 may be connected to the first to third pixels PX1, PX2, and PX3 (or the pixel columns) in the display panel 100 in an order different from that of other channels (for example, the first channel group CH_G1). In this case, the data driver 400 may output the data signals in the first output order through the other channels (for example, the first channel group CH_G1), and output the data signals in the second output order through the some channels (for example, the second channel group CH_G2). Therefore, each of the first to third pixels PX1, PX2, and PX3 in the display area DA (in particular, the first to third pixels PX1, PX2, and PX3 in the second display area DA2) may receive a data signal of a corresponding color, and may emit light with a desired luminance. Accordingly, deterioration of the display quality of the display device 1000 may be prevented.

According to an embodiment of the disclosure, the display device 1000 includes: a display panel 100 including a first display area DA1 and a second display area DA2, and includes pixels PX disposed in the first and second display areas DA1 and DA2; and a data driver 400 configured to output data signals to the pixels through a plurality of channels CH1-CHm arranged along a first direction DR1, wherein the channels CH1-CHm include a first channel group CH1-CHk corresponding to the first display area DA1 and a second channel group CHk+1-CHm corresponding to the second display area DA2.

Figure 8:
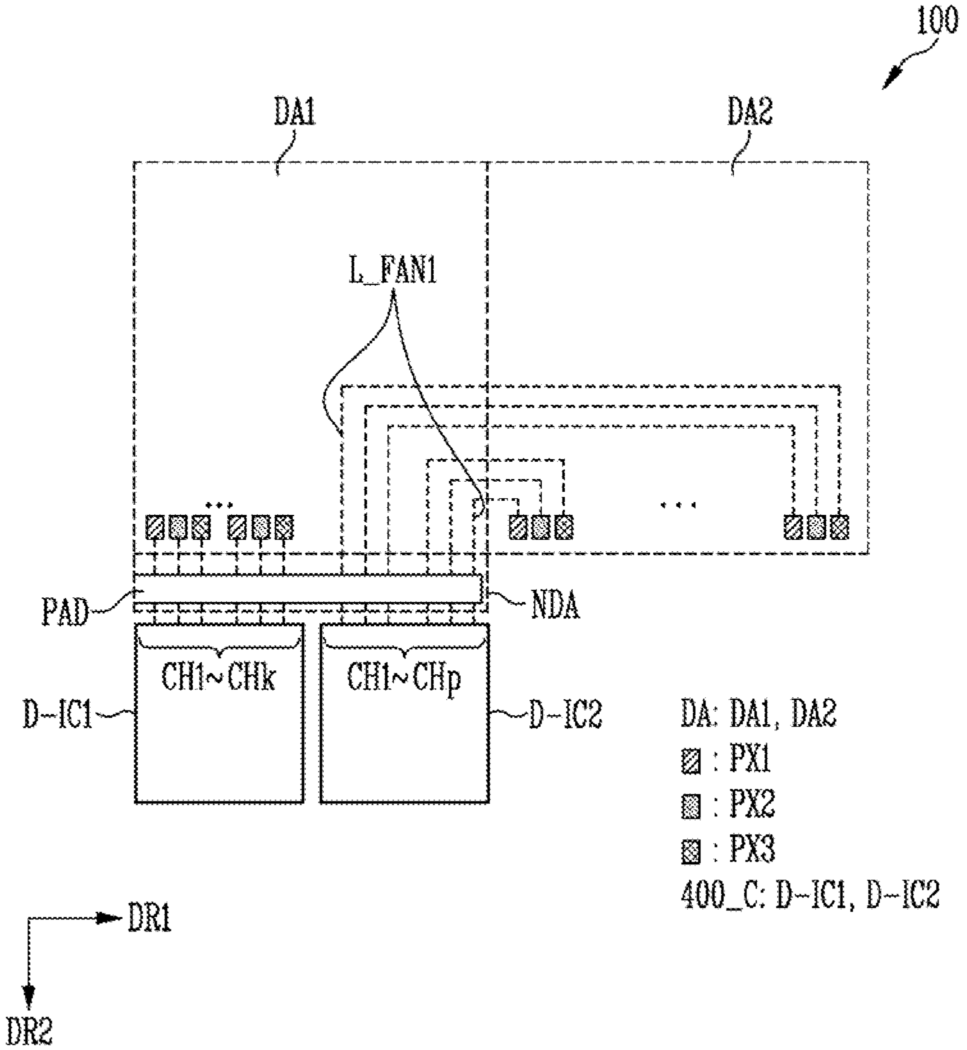
FIG. 8 is a diagram illustrating a comparative example of the display device of FIG. 1.
Figure 9:
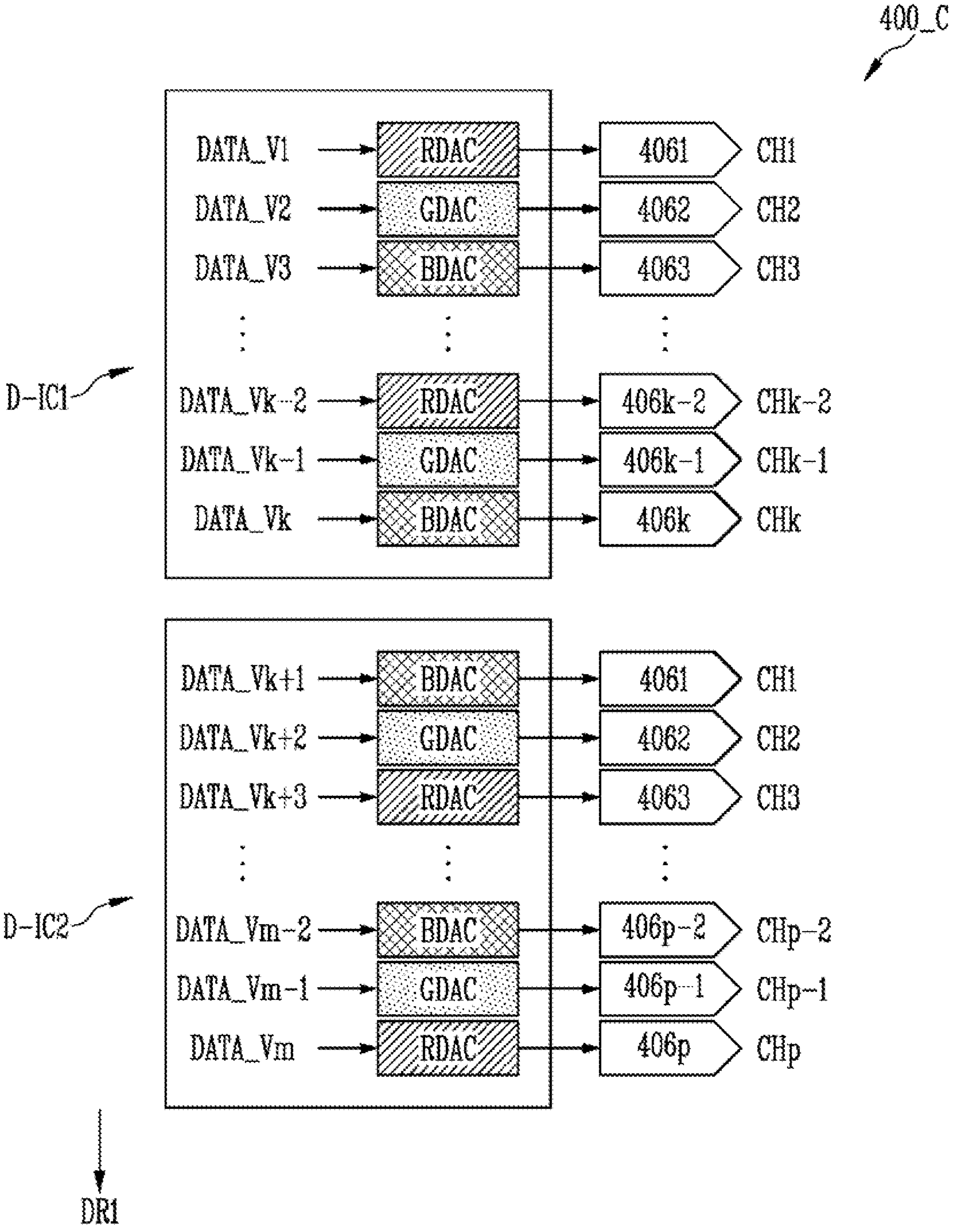
FIG. 9 is a diagram illustrating the operation of the data driver included in the display device of FIG. 8.

At least some of the pixels PX emit light in different colors R,G,B and are arranged in a first pixel arrangement R,G,B along the first direction DR1, and based on channel selection SCFF information about the second channel group CHk+1-CHm or the first channel group CH1-CHk, the data driver 400 outputs first data signals in a first output order R,G,B along the first direction DR1 corresponding to the first pixel arrangement through the first channel group CH1-CHk, and outputs second data signals in a second output order B,G,R different from the first output order R,G,B along the first direction DR1 through the second channel group CHk+1-CHm, FIG. 8 is a diagram illustrating a comparative example of the display device of FIG. 1. FIG. 8 is a diagram corresponding to FIG. 6. FIG. 9 is a diagram illustrating the operation of the data driver included in the display device of FIG. 8. FIG. 9 is a diagram corresponding to FIG. 7.

Referring to FIGS. 6 to 9, since the display device of FIG. 8 is substantially the same as or similar to the display device 1000 of FIG. 6 except that a data driver 400_C includes two driving integrated circuits D-IC1 and D-IC2, a repetitive description is omitted.

A first driving integrated circuit D-IC1 may correspond to the first channel group CH_G1, and a second driving integrated circuit D-IC2 may correspond to the second channel group CH_G2. The first driving integrated circuit D-IC1 may output the data signals in the first output order, and the second driving integrated circuit D-IC2 may output the data signals in the second output order.

As shown in FIG. 9, the first driving integrated circuit D-IC1 may output the red, green, and blue data signals through the first channel CH1, the second channel CH2, and the third channel CH3, respectively, and may output the red, green, and blue data signals through the (k−2)-th channel CHk−2, the (k−1)-th channel CHk−1, and the k-th channel CHk, respectively. In other words, the first driving integrated circuit D-IC1 may output the data signals in the order of red-green-blue along the first direction DR1 through the first to k-th channels CH1 to CHm.

The second driving integrated circuit D-IC2 may outputs the blue, green, and red data signals through the first channel CH1, the second channel CH2, and the third channel CH3, respectively, and may output the blue, green, and red data signals through a (p−2)-th channel CHp−2 (where p=m−k), a (p−1)-th channel CHp−1, and a p-th channel CHp, respectively. In other words, the second driving integrated circuit D-IC2 may output the data signals in the order of blue, green, and red along the first direction DR1 through the first to p-th channels CH1 to CHp.

However, a manufacturing cost of the display device may be increased, due to the two integrated circuits, in other words, the first and second driving integrated circuits D-IC1 and D-IC2, for supplying the data signals in different output orders to the first and second display areas DA1 and DA2. In addition, since the two integrated circuits are mounted or connected to the display panel 100 and a bonding test is individually performed, a manufacturing time may be increased. In addition, in order for the driving integrated circuit to output the data signal in the first output order as the first driving integrated circuit D-IC1 or output the data signal in the second output order as the second driving integrated circuit D-IC2, a function of changing the output order of data signal with respect to all channels is also required (refer to FIGS. 5A and 5B).

Since the data driver 400 according to embodiments of the disclosure may be implemented as one integrated circuit, and may provide the function of changing the data output order of the some channels in response to the control signal CS (in other words, the data output order information DCFF and the channel selection information SCFF), the manufacturing cost and the manufacturing time of the display device may be reduced.

Figure 10:
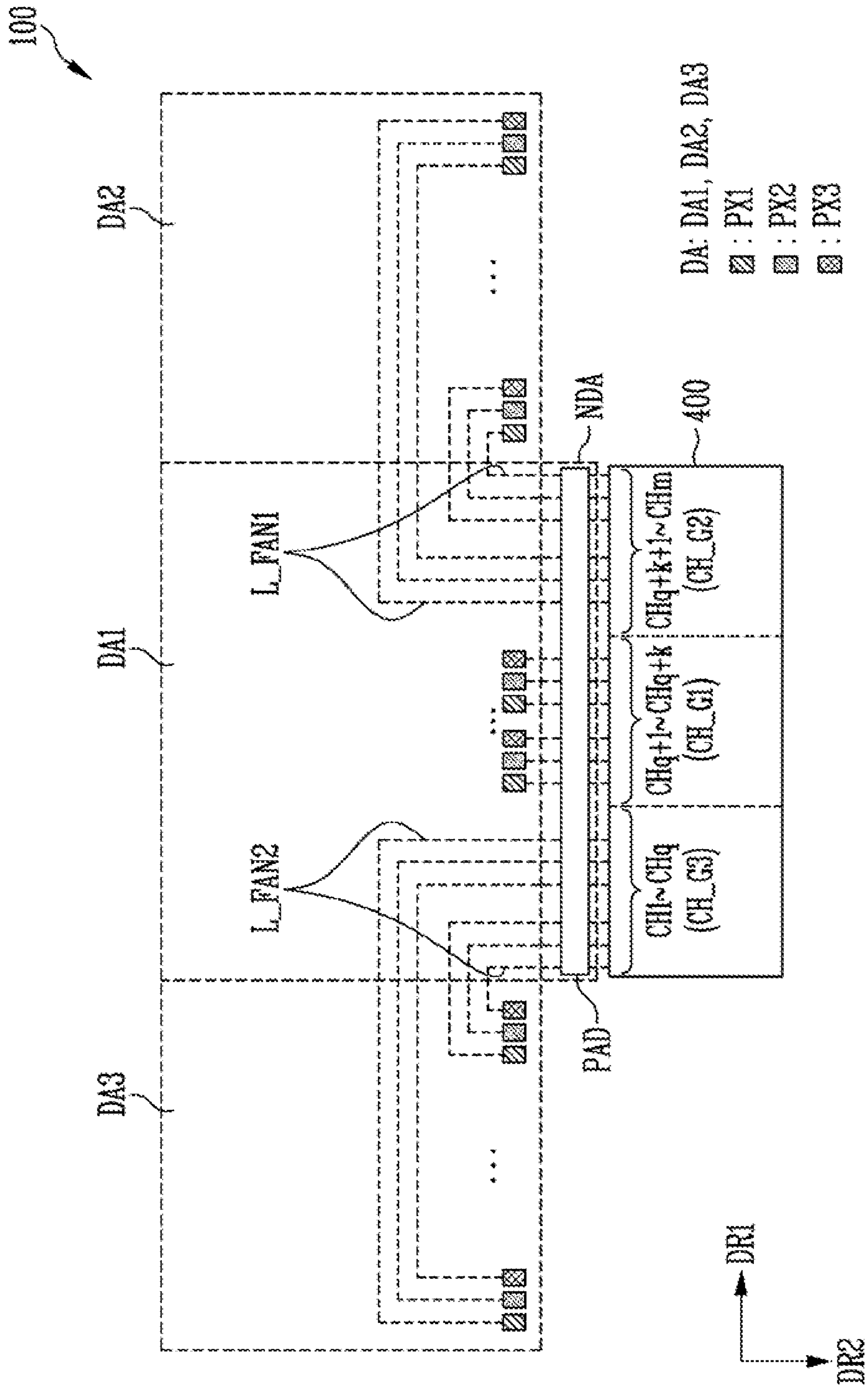
FIG. 10 is a diagram illustrating another embodiment of the display device of FIG. 1.
Figure 11:
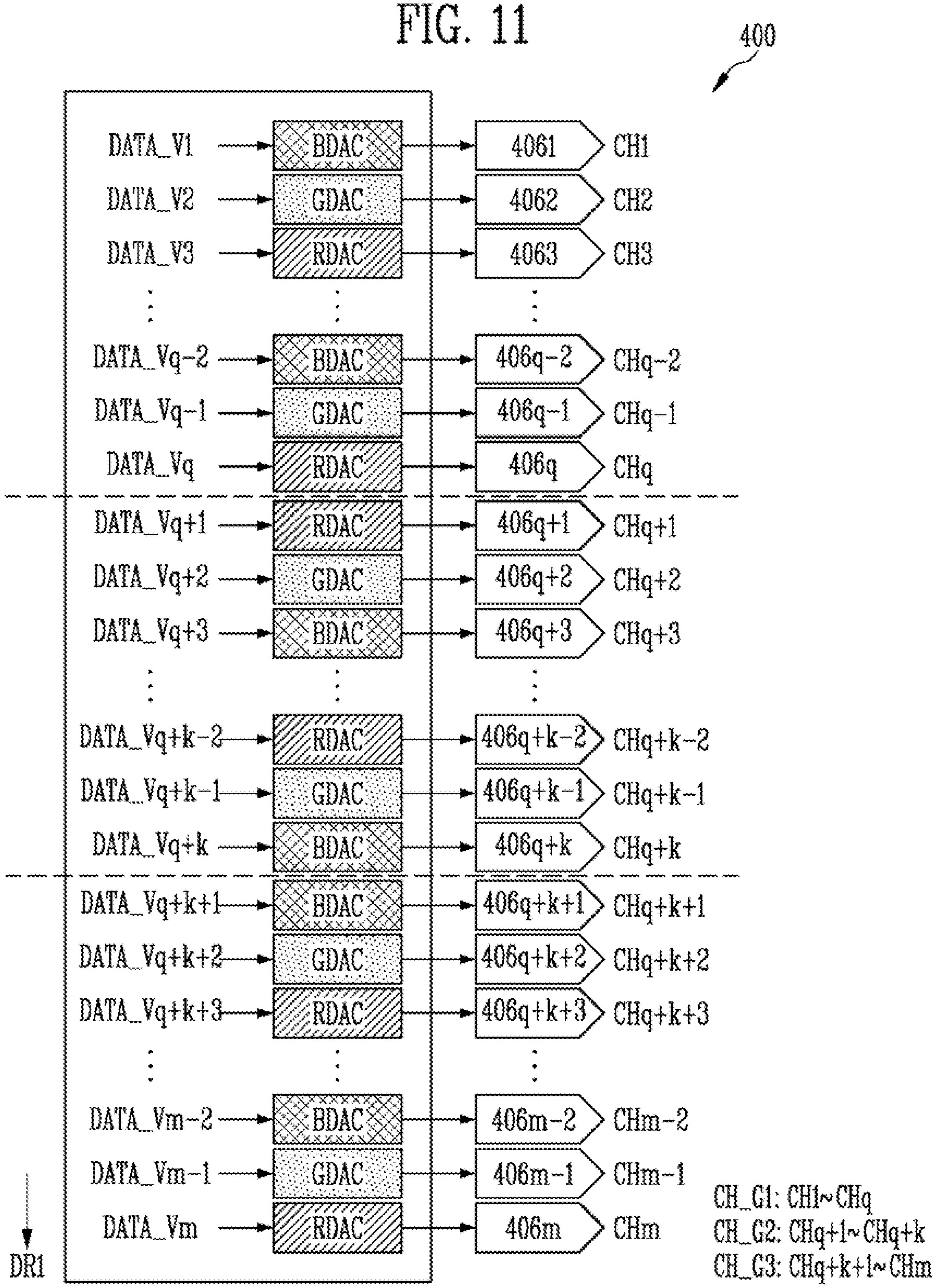
FIG. 11 is a diagram illustrating the operation of the data driver included in the display device of FIG. 10.

FIG. 10 is a diagram illustrating another embodiment of the display device of FIG. 1. FIG. 10 is a diagram corresponding to FIG. 6. FIG. 11 is a diagram illustrating the operation of the data driver included in the display device of FIG. 10. FIG. 11 is a diagram corresponding to FIG. 7.

Referring to FIGS. 6, 7, 10, and 11, since the display device 1000 of FIG. 10 is substantially the same as or similar to the display device 1000 of FIG. 6 except that the display panel 100 (or the display area DA) further includes a third display area DA3 and the data driver 400 further includes a third channel group CH_G3, a repetitive description is omitted.

The third display area DA3 may be positioned in a direction opposite to the first direction DR1 with respect to the first display area DA1. In other words, the third display area DA3 may be spaced apart from the second display area DA2 with the first display area DA1 interposed therebetween.

The (q+1)-th to (q+k)-th channels CHq+1 to CHq+k included in the first channel group CH_G1 of the data driver 400 may be connected the first to third pixels PX1, PX2, and PX3 in the first display area DA1. The (q+1)-th to (q+k)-th channels in the first channel group CH_G1 of the data driver 400 may output the data signals in the first output order, in response to the pixel arrangement (or the first pixel arrangement) of the first to third pixels PX1, PX2, and PX3. As shown in FIG. 11, the (q+1)-th to (q+k)-th channels CHq+1 to CHq+k in the first channel group CH_G1 of the data driver 400 may output the data signals in the order of red-green-blue along the first direction DR1.

The (q+k+1)-th to m-th channels CHq+k+1 to CHm included in the second channel group CH_G2 of the data driver 400 may be connected to the first to third pixels PX1, PX2, and PX3 in the display area DA2 through the first fan-out lines L_FAN1. The (q+k+1)-th to m-th channels CHq+k+1 to CHm included in the second channel group CH_G2 of the data driver 400 may be connected the first to third pixels PX1, PX2, and PX3 in the display area DA2 in a reverse order. The (q+k+1)-th to m-th channels CHq+k+1 to CHm included in the second channel group CH_G2 of the data driver 400 may output the data signals in the second output order, according to a connection order with the first to third pixels PX1, PX2, and PX3 (or the pixel columns) in the second display area DA2. As shown in FIG. 11, the (q+k+1)-th to m-th channels CHq+k+1 to CHm included in the second channel group CH_G2 of the data driver 400 may output the data signals in the order of blue-green-red along the first direction DR1.

In an embodiment of the disclosure, the display panel 100 may further include second fan-out lines L_FAN2. The second fan-out lines L_FAN2 may extend from the non-display area NDA to the third display area DA3 via the first display area DA1 and connect the first to q-th channels CH1 to CHq included in the third channel group CH_G3 of the data driver 400 to the first to third pixels PX1, PX2, and PX3 in the third display area DA3.

The second fan-out lines L_FAN2 may not overlap each other. In this case, the first to k-th channels CH1 to CHk in the third channel group CH_G3 may be connected to the first to third pixels PX1, PX2, and PX3 in the display area DA2 in a reverse sequential order along the first direction DR1. For example, the first channel CH1 may be connected to a pixel closet to the first display area DA1 (for example, the third pixel PX3, the blue pixel, or a last pixel column in the third display area DA3), and the q-th channel CHq may be connected to a pixel the farthest from the first display area DA1 (for example, the first pixel PX1 the red pixel, or a first pixel column in the third display area DA3).

The first to k-th channels CH1 to CHk in the third channel group CH_G3 of the data driver 400 may output the data signals in the second output order, according to a connection order with the first to third pixels PX1, PX2, and PX3 (or the pixel columns) in the third display area DA3.

For example, as shown in FIG. 11, the first source buffer 4061 configuring the first channel CH1 may be connected to the third color digital-to-analog converter BDAC, and may output the blue data signal corresponding to the first data value DATA_V1. The second source buffer 4062 configuring the second channel CH2 may be connected to the second color digital-to-analog converter GDAC, and may output the green data signal corresponding to the second data value DATA_V2. The third source buffer 4063 configuring the third channel CH3 may be connected to the first color digital-to-analog converter RDAC, and may output the red data signal corresponding to the third data value DATA_V3. Similarly, the (q−2)-th source buffer **406*q*-2 configuring the (q−2)-th channel CHq−2 may be connected to the third color digital-to-analog converter BDAC, and may output the blue data signal corresponding to a (q−2)-th data value DATA_Vq−2. The (q−1)-th source buffer 406*q*-1 configuring the (q−1)-th channel CHq−1 may be connected to the second color digital-to-analog converter GDAC, and may output the green data signal corresponding to a (q−1)-th data value DATA_Vq−1. The q-th source buffer 406*q*** configuring the q-th channel CHq may be connected to the first color digital-to-analog converter RDAC, and may output the red data signal corresponding to a q-th data value DATA_Vq.

In other words, the first to q-th channels CH1 to CHq in the third channel group CH_G3 of the data driver 400 may output the data signals in the order of blue-green-red along the first direction DR1. Therefore, each of the first to third pixels PX1, PX2, and PX3 disposed in the third display area DA3 may normally receive a data signal of a corresponding color.

As described above, some channels (for example, the first and third channel groups CH_G1 and GH_G3) of the data driver 400 may be connected to the first to third pixels PX1, PX2, and PX3 (or the pixel columns) in the display panel 100 in an order different from that of other channels (for example, the first channel group CH_G1). In this case, the data driver 400 may output the data signals in the first output order through the other channels (for example, the first channel group CH_G1), and output the data signals in the second output order through the some channels (for example, the second and third channels CH_G2 and GH_G3). Therefore, each of the first to third pixels PX1, PX2, and PX3 in the display area DA (in particular, the first to third pixels PX1, PX2, and PX3 in the second and third display areas DA2 and DA3) may receive a data signal of a corresponding color and emit light with a desired luminance. Accordingly, deterioration of the display quality of the display device 1000 may be prevented.

In addition, as described with reference to FIGS. 8 and 9, since the data driver 400 may be implemented as one integrated circuit, and may provide the function of changing the data output order of the some channels in response to the control signal CS (in other words, the data output order information DCFF and the channel selection information SCFF), the manufacturing cost and the manufacturing time of the display device 1000 may be reduced.

FIG. 12 is a diagram illustrating an embodiment of a data output order change option provided to the data driver included in the display device of FIG. 1. FIG. 12 illustrates an embodiment of an option applicable to the data driver 400 (or the data driver 400 of FIGS. 7 and 11).

Referring to FIGS. 1 and 12, the controller 200 may provide the control signal CS to the data driver 400. The control signal CS may include the data output order information DCFF (or the data output order register) and the channel selection information SCFF (or the channel selection register).

The data output order information DCFF may include a setting value for a basic data output order and a data output order for a selected channel. The data output order information DCFF may be expressed as 2 bits, but is not limited thereto.

For example, when the setting value of the data output order information DCFF is "HH", all channels may output the data signals in the first output order. For example, the first channel CH1 may output a red data signal R, the second channel CH2 may output a green data signal G, and the third channel CH3 may output a blue data signal B. Similarly, a 2248-th channel CH2248 (in other words, the (m−2)-th channel) may output the red data signal R, a 2249-th channel CH2249 (in other words, the (m−1)-th channel) may output the green data signal G, a 2250-th channel CH2250 (in other words, the m-th channel) may output the blue data signal B.

For example, when the setting value of the data output order information DCFF is "LL", all channels may output the data signals in the second output order. For example, the first channel CH1, the second channel CH2, the third channel CH3, the 2248-th channel CH2248, the 2249-th channel CH2249, and the 2250-th channel CH2250 may output the blue, green, red, blue, green, and red data signals.

For example, when the setting value of the data output order information DCFF is "HL", the unselected channels may output the data signals in the first output order, and the selected channels may output the data signals in the second output order. For example, channels positioned before the selected channels (e.g., first unselected channels) may output the data signals in the red-green-blue order (in other words, the RGB order), the selected channels may output the data signals in the blue-green-red order (that is, the BGR order), and channels positioned after the selected channels (e.g., second unselected channels) may output the data signals again in the red-green-blue order (in other words, the RGB order). For example, the data output order information DCFF of "HL" may be applied to the display device 1000 of FIG. 6 or the data driver 400 of FIG. 7.

For example, when the setting value of the data output order information DCFF is "LH", the unselected channels may output the data signals in the second output order, and the selected channels may output the data signals in the first output order. For example, the channels positioned before the selected channels (e.g., first unselected channels) may output the data signals in the blue-green-red order (in other words, the BGR order), the selected channels may output the data signals in the red-green-blue order (in other words, the RCB order), and the channels positioned after the selected channels (e.g., second unselected channels) may output the data signals again in the blue-green-red order (in other words, the BGR order). For example, the data output order information DCFF of "LH" may be applied to the display device 1000 of FIG. 10 or the data driver 400 of FIG. 11.

The channel selection information SCFF may include a setting value (or a selection value) for the selected channels among the channels. The channel selection information SCFF may be expressed in 2 bits, but is not limited thereto. For example, the selection information SCFF may be expressed in 3 or 4 bits. For example, when a width or a position of the selected channels varies according to various products (in other words, a product to which the display device 1000 is applied), more bits may be allocated to define each of the various types of the selected channels.

In an embodiment of the disclosure, a first value (or a first bit) of the channel selection information SCFF may indicate or represent a first channel among the selected channels, and a second value (or a second bit) of the channel selection information SCFF may indicate or represent a last channel among the selected channel.

For example, when the setting value of the channel selection information SCFF is "HH", 1126-th to 2250-th channels CH1126 to CH2250 may be selected. For example, the channel selection information SCFF of "HH" may be applied to the display device 1000 of FIG. 6 or the data driver 400 of FIG. 7 (in other words, k is 1125).

For example, when the setting value of the channel selection information SCFF is "HL", 1126-th to 1500-th channels CH1126 to CH1500 may be selected. For example, the channel selection information SCFF of "HL" may be applied to the display device 1000 of FIG. 10 or the data driver 400 of FIG. 11 (in other words, q is 1125 and k is 1500).

For example, when the setting value of the channel selection information SCFF is "LH", 751-th to 2250-th channels CH751 to CH2250 may be selected. For example, the channel selection information SCFF of "LH" may be applied to the display device 1000 of FIG. 6 or the data driver 400 of FIG. 7 (in other words, k is 750).

For example, when the setting value of the channel selection information SCFF is "LL", the 751-th to 1500-th channels CH751 to CH1500 may be selected. For example, the channel selection information SCFF of "HL" may be applied to the display device 1000 of FIG. 10 or the data driver 400 of FIG. 11 (in other words, q is 750 and k is 1500).

Figure 13:
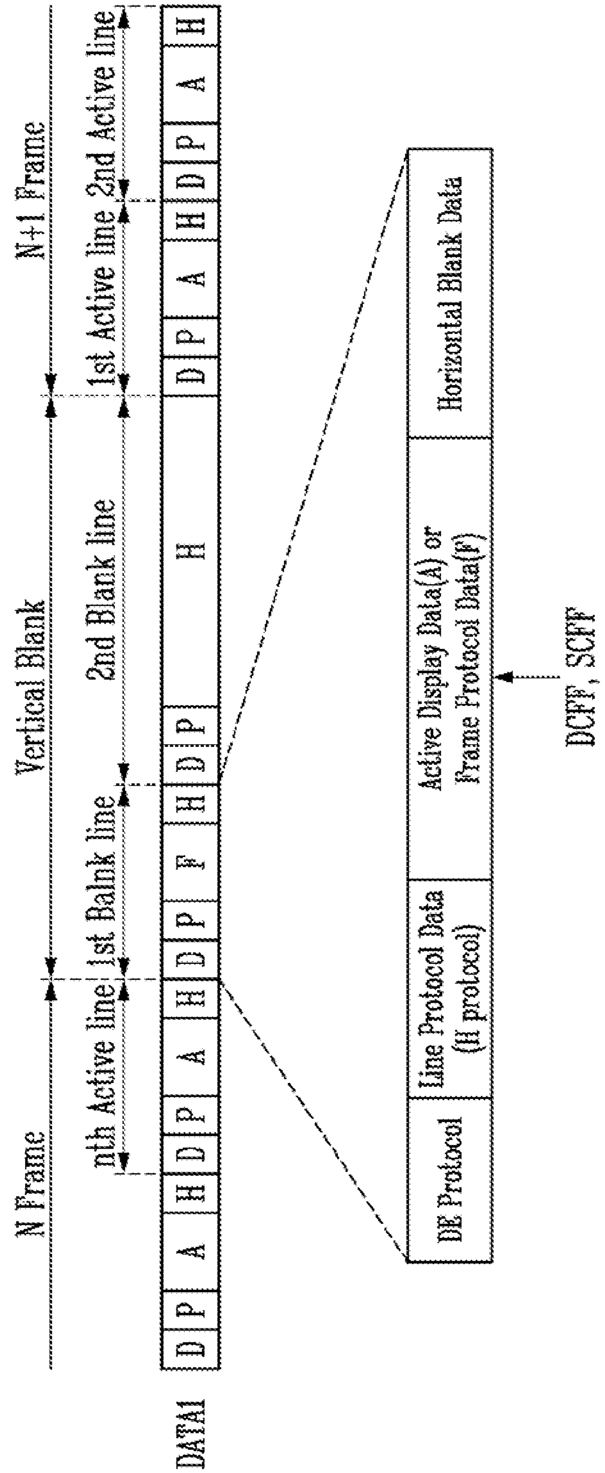
FIGS. 13 and 14 are diagrams illustrating an embodiment of a signal provided to the data driver from a controller included in the display device of FIG. 1.
Figure 14:
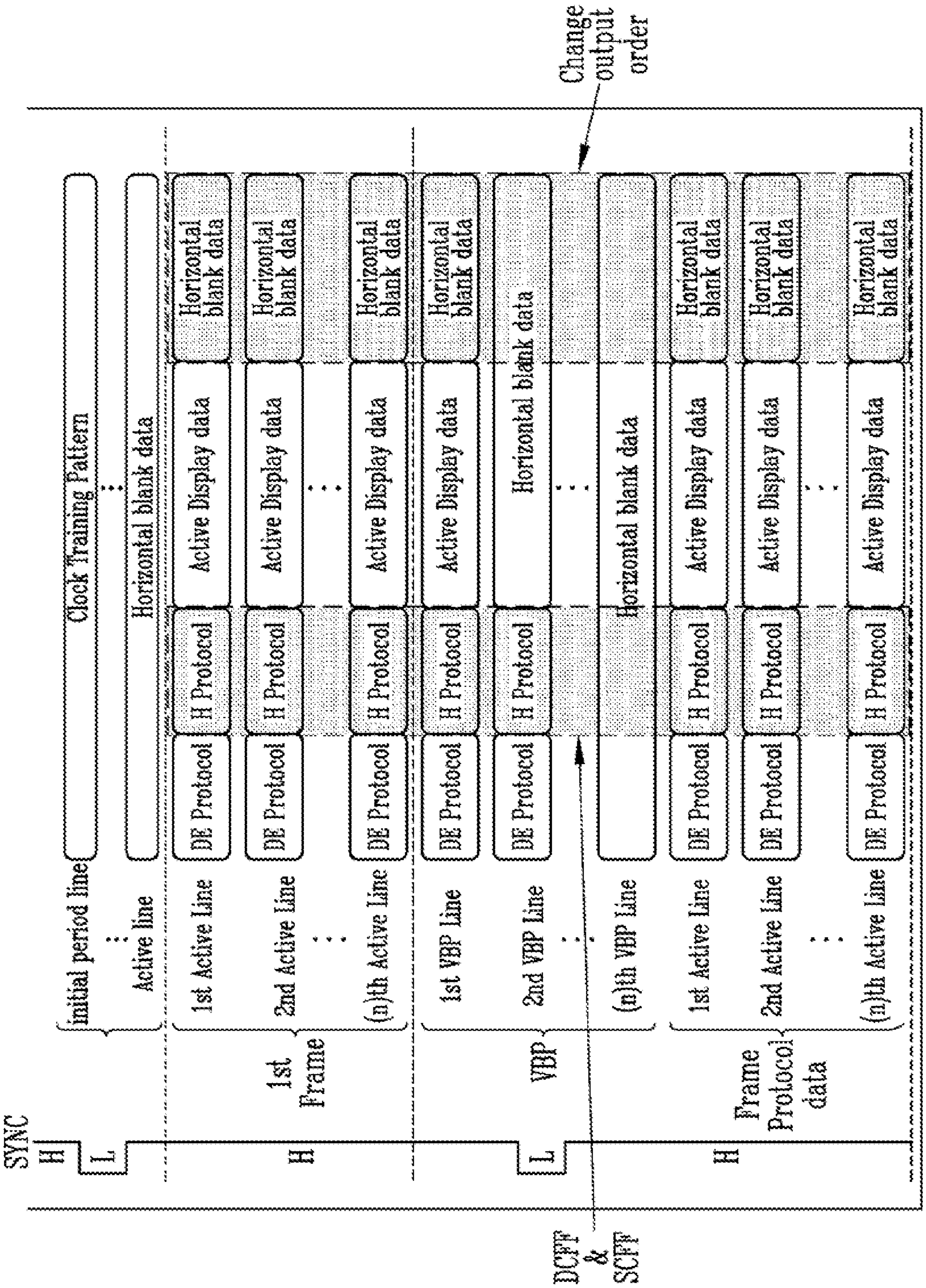

As described above, the data output order information DCFF (or the data output order register) defining the order in which the data signals are output through the channels (or the selected and/or the unselected channels) and the channel selection information SCFF (or the channel selection register) for selecting some of the channels may be provided, and thus, the data driver 400 (or the data driver 400 implemented as one integrated circuit) may be used in varies display devices 1000 required to change the data output order, FIGS. 13 and 14 are diagrams illustrating an embodiment of a signal provided to the data driver from the controller included in the display device of FIG. 1.

First, referring to FIGS. 1 and 13, the signal provided from the controller 200 to the data driver 400 during a frame (or a frame period) may be referred to as frame data. In addition, the signal provided from the controller 200 to the data driver 400 for each line in a frame (or for each active period corresponding to a pixel row) may be referred to as line data.

The line data may include data enable (DE) protocol, line protocol data (or horizontal protocol; H protocol), active display data, and horizontal blank data. In a vertical blank (or a vertical blank period) between frames (or frame data), the line data (or frame data) may include frame protocol data instead of the active display data. For example, in FIG. 13, the N frame has the following pattern: DPAH and DPAH. Here, DPAH may correspond to data enable protocol (D), horizontal protocol (P), active display data (A) and horizontal blank data (H). However, the vertical blank between the N frame and the N+1 frame has the following pattern: DPFH and DPH. Here, DPFH may correspond to data enable protocol (D), horizontal protocol (P), frame protocol data (F) and horizontal blank data (H).

The data enable protocol may inform a transmission start of data corresponding to the pixel row or inform a timing at which the data is applied. For example, the data enable protocol may inform a transmission start of data corresponding to an n-th pixel row of an N-th frame (where N is a positive integer), data corresponding to a first pixel row of an (N+1)-th frame, and the like.

The line protocol data may inform transmission of the active display data or the frame protocol data or the vertical blank period. According to an embodiment of the disclosure, the line protocol data may further include setting information for determining an operation option of the data driver 400 in a line unit.

The active display data may include data values (for example, grayscale values) corresponding to the pixels included in one pixel row. The frame protocol data may include setting information (or setting data) for determining the operation option of the data driver 400 in a frame unit.

Referring to FIG. 14, an active period may be set when a synchronization signal SYNC has a logic high level, and a blank period may be set when the synchronization signal SYNC has a logic low level. In the active period, active data (for example, the active display data) may be transmitted from the controller 200 to the data driver 400, and in the blank period, the frame protocol and blank data may be transmitted from the controller 200 to the data driver 400.

Before a first frame starts, a clock training pattern may be transmitted from the controller 200 to the data driver 400. In this case, the data driver 400 may recover the data clock signal (in other words, the data clock signal used for the data sampling operation) from the clock training pattern. After the clock signal is normally recovered, the first frame may be started.

In an embodiment of the disclosure, at least one of the data output order information DCFF (or the data output order register) and the channel selection information SCFF (or the channel selection register) may be included in frame protocol data. As shown in FIG. 13, the controller 200 may transmit the frame protocol data including the data output order information DCFF and the channel selection information SCFF to the data driver 400. In this case, the data driver 400 may change the output order of the data signals to be output through the channels in a next frame in the vertical blank period. In other words, the data driver 400 may change the output order of the data signals output through the channels in a frame unit.

In another embodiment of the disclosure, as shown in FIG. 14, at least one of the data output order information DCFF and the channel selection information SCFF may be included in the line protocol data. For example, the controller 200 may transmit the line protocol data including the data output order information DCFF and the channel selection information SCFF to the data driver 400. For example, a line protocol may be transmitted from the controller 200 to the data driver 400 for each active period corresponding to one pixel row. In this case, the data driver 400 may change the output order of the data signals output through the channels in the horizontal blank period (in other words, a period in which the horizontal blank data is transmitted) of a corresponding active period.

Figure 15:
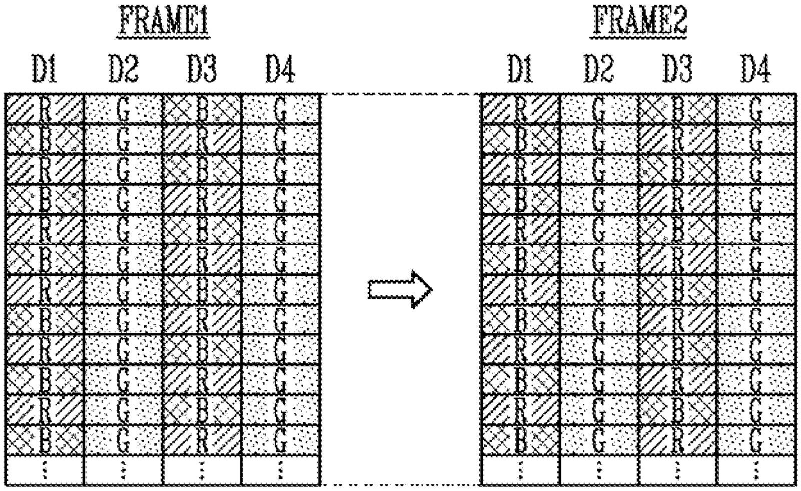
FIG. 15 is a diagram illustrating an operation of a first mode of the display device of FIG. 1.
Figure 16:
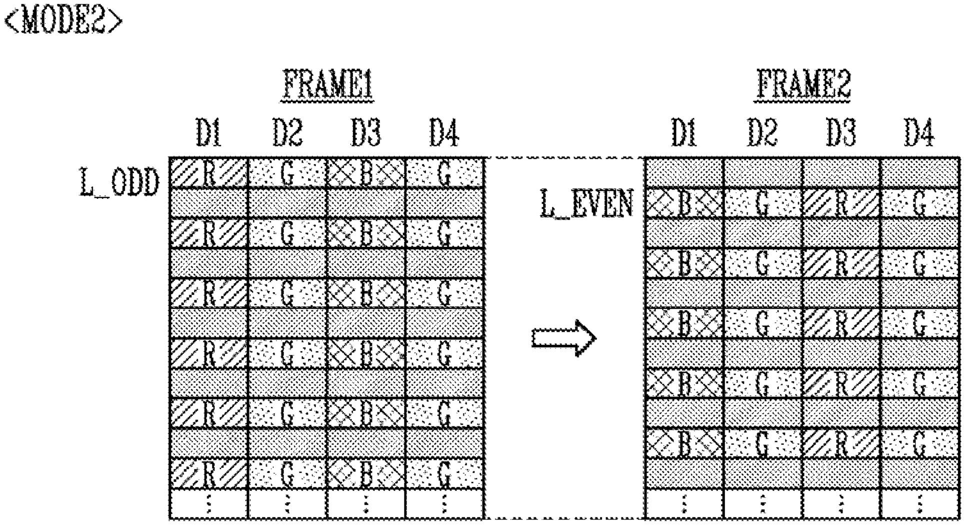
FIG. 16 is a diagram illustrating an operation of a second mode of the display device of FIG. 1.
Figure 17:
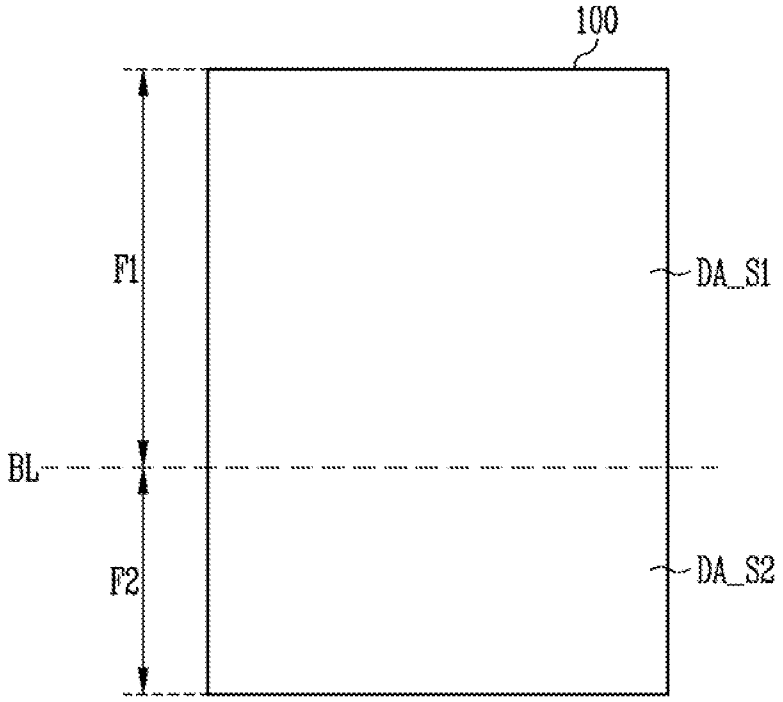
FIGS. 17 and 18 are diagrams illustrating an operation of a third mode of the display device of FIG. 1.
Figure 18:
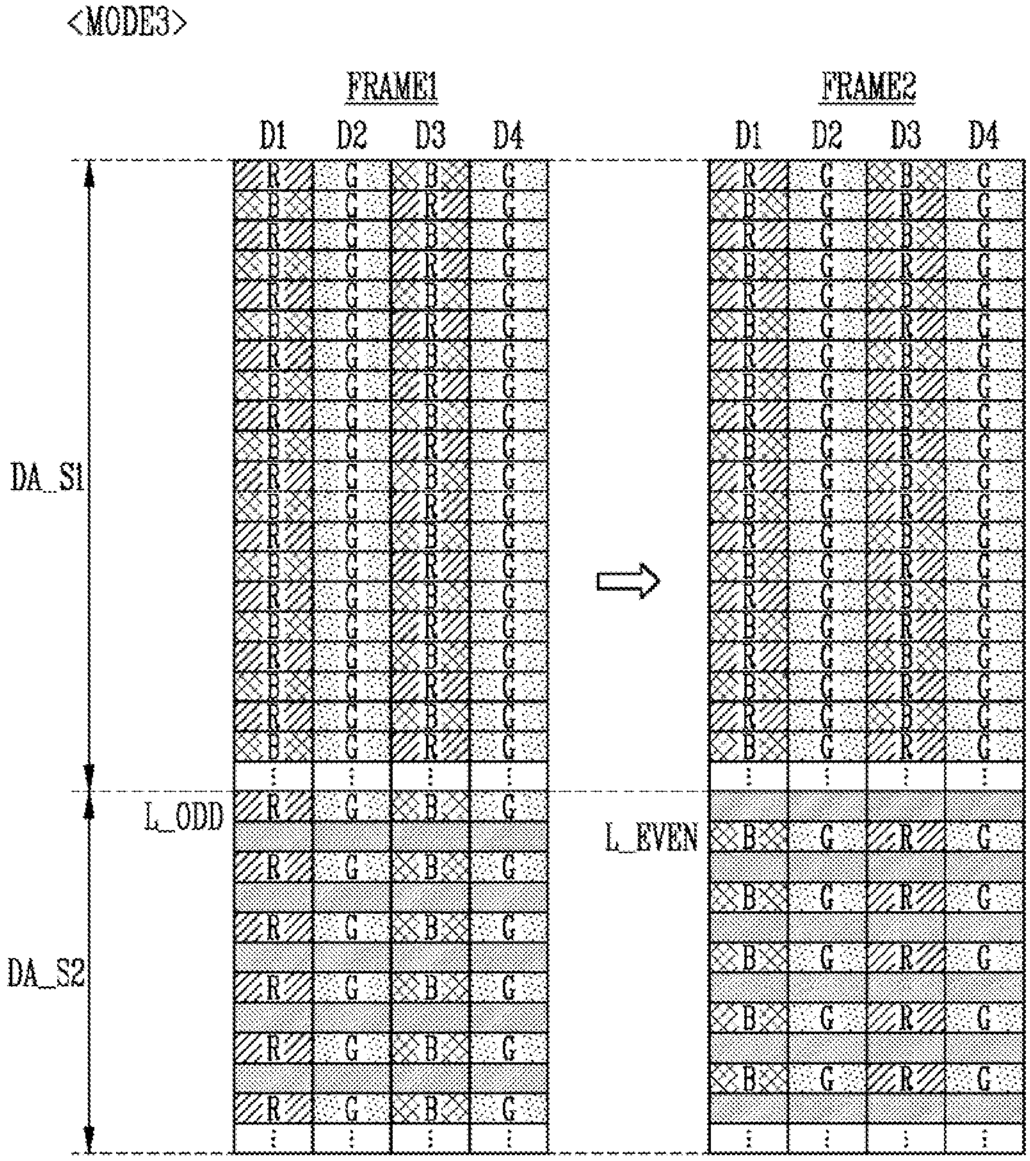

Hereinafter, a case in which the data output order of the channels of the data driver 400 is changed in the frame unit or the line unit is described with reference to FIGS. 15 to 18, FIG. 15 is a diagram illustrating an operation of a first mode of the display device of FIG. 1. FIG. 16 is a diagram illustrating an operation of a second mode of the display device of FIG. 1. FIGS. 17 and 18 are diagrams illustrating an operation of a third mode of the display device of FIG. 1. FIGS. 15, 16, and 18 show the data signals provided to the first to fourth data lines D1 to D4 when the display panel 100 includes the first to third pixels PX1, PX2, and PX3 arranged in the pixel arrangement (or the second pixel arrangement) of FIG. 33. The display panel 100 of FIG. 6 or the display panel 100 of FIG. 10 may be applied to the embodiments of FIGS. 15 to 18.

First, referring to FIGS. 1 and 15, in the first mode MODE1, the display device 1000 may perform general scan and write driving. For example, in each of a first frame FRAME1 and a second frame FRAME2, the data driver 400 may provide the data signals to all pixel rows. For example, the data signals of the red-green-blue-green (R,G,B,G) order (in other words, the first output order) may be provided to the first to fourth data lines D1 to D4 corresponding to the first pixel row (and odd-numbered pixel row) shown in FIG. 33. In addition, the data signals of the blue-green-red-green order (B,G,R,G) (in other words, the second output order) may be provided to the first to fourth data lines D1 to D4 corresponding to the second pixel row (and even-numbered pixel row) shown in FIG. 3B. In other words, the output order of the data signals may be changed for each pixel row. To accomplish this, the data output order information DCFF may be included in the line protocol data and transmitted from the controller 200 to the data driver 400 for each pixel row. Referring to FIG. 12, for example, the data output order information DCFF may have setting values of "HL" and "LH" alternately in a pixel row unit.

Since the selected channels are not changed (for example, a structure of the display panel 100 of FIG. 6 or the display panel 100 of FIG. 10 is not changed), the channel selection information SCFF may not be included in the line protocol data, but is not limited thereto. For example, the channel selection information SCFF may also be included in the line protocol data, and may be transmitted from the controller 200 to the data driver 400 for each pixel row together with the data output order information DCFF.

Referring to FIGS. 1 and 16, in the second mode MODE2, the display device 1000 may perform partial scan driving. For example, when the display device 1000 displays a still image, the display device 1000 may be driven at a low frequency to reduce power consumption. In addition, to prevent image flicker when driving at the low frequency, the display device 1000 may periodically scan some pixel rows that are different from each other.

For example, the data signals may be provided only to odd-numbered pixel rows L_ODD in the first frame FRAME1. During the first frame FRAME1, only the data signals in the red-green-blue-green order (in other words, the first output order) may be provided to the first to fourth data lines D1 to D4. Data signals may not be provided to the even-numbered pixel rows L_EVEN during the first frame FRAME1. For example, the data signals may be provided only to even-numbered pixel rows L_EVEN in the second frame FRAME2. During the second frame FRAME2, only the data signals in the blue-green-red-green order (in other words, the second output order) may be provided to the first to fourth data lines D1 to D4. Data signals may not be provided to the odd-numbered pixel rows L_ODD during the second frame FRAME2. In other words, the output order of the data signals may be changed for each frame. To accomplish this, the data output order information DCFF may be included in the frame protocol data and transmitted from the controller 200 to the data driver 400 for each frame. Referring to FIG. 12, for example, the data output order information DCFF may have setting values of "HL" and "LH" alternately in the frame unit.

Since the selected channels are not changed, the channel selection information SCFF may not be included in the frame protocol data, but is not limited thereto. For example, the channel selection information SCFF may also be included in the frame protocol data, and may be transmitted from the controller 200 to the data driver 400 together with the data output order information DCFF for each frame.

Referring to FIGS. 1, 17, and 18, in the third mode MODE3, a moving image may be displayed in a first sub-area DA_S1 of the display panel 100 and a still image may be displayed in a second sub-area DA_S2. The first sub-area DA_S1 and the second sub-area DA_S2 may be divided by a virtual boundary line BL. The boundary line BL may correspond to a predetermined pixel row. In this case, the first sub-area DA_S1 may be driven at a first frequency F1, for example, 60 Hz, and the second sub-area DA_S2 may be driven at a second frequency F2, for example, 30 Hz. In other words, to reduce power consumption, the first sub-area DA_S1 and the second sub-area DA_S2 may be driven at different driving frequencies (for example, multi-frequency driving).

In the first frame FRAME1 and the second frame FRAME2, an entire scan driving may be performed on the first sub-area DA_S1 and a partial scan driving may be performed on the second sub-area DA_S2.

For example, as shown in FIG. 18, in the first frame FRAME1 and the second frame FRAME2, the data signals of the red-green-blue-green order (in other words, the first output order) may be provided to the first to fourth data lines D1 to D4 corresponding to the first pixel row (and the odd-numbered pixel row) of the first sub-area DA_S1. In addition, the data signals of the blue-green-red-green order (in other words, the second output order) may be provided to the first to fourth data lines D1 to D4 corresponding to the second pixel row (and the even-numbered pixel row) of the first sub-area DA_S1. In other words, the output order of the data signals for the first sub-area DA_S1 may be changed for each pixel row in the first frame FRAME1 and the second frame FRAME2. To accomplish this, the data output order information DCFF for the first sub-area DA_S1 may be included in the line protocol data, and may be transmitted from the controller 200 to the data driver 400 for each pixel row.

Furthermore, the data signals may be provided only to the odd-numbered pixel rows L_ODD of the second sub-area DA_S2 in the first frame FRAME1. The data signals of the red-green-blue-green order (in other words, the first output order) may be provided in response to the second sub-area DA_S2 during the first frame FRAME1. In addition, the data signals may be provided only to the even-numbered pixel rows L_EVEN of the second sub-area DA_S2 in the second frame FRAME2. The data signals of the blue-green-red-green order (in other words, the second output order) may be provided in response to the second sub-area DA_S2 during the second frame FRAME2. In other words, the output order of the data signals for the second sub-area DA_S2 may be changed for each frame. Therefore, the data output order information DCFF may be included in the line protocol data in response to the first pixel row of the second sub-area DA_S2, and may be transmitted from the controller 200 to the data driver 400. Thereafter, since the output order of the data signals is not changed until the a next frame is started, the data output order information DCFF may not be provided separately from the controller 200 to the data driver 400 in response to the first pixel row of the second sub-area DA_S2. However, the disclosure is not limited thereto. For example, the data output order information DCFF having the same setting value may be included in the line protocol data corresponding to the second sub-area DA_S2, and may be transmitted from the controller 200 to the data driver 400 in the pixel row unit until the next frame is started.

As described above, the data output order information DCFF (or the data output order register) and the channel selection information SCFF (or the channel selection register) may be included in the frame protocol data or the line protocol data, and may be provided from the controller 200 to the data driver 400. When the frame protocol data including the data output order information DCFF and/or the channel selection information SCFF is transmitted, the data driver 400 may change the output order of the data signals in the blank period between the corresponding frame and the next frame. When the line protocol data including the data output order information DCFF and/or the channel selection information SCFF is transmitted, the data driver 400 may change the output order of the data signals in the horizontal blank period (in other words, a period in which the horizontal blank data is transmitted) of the corresponding line.

Although the above has been described with reference to the embodiments of the disclosure, it will be understood by those skilled in the art that the disclosure may be variously changed or modified in a range without departing from the spirit and scope of the disclosure as set forth in the claims below.

What is claimed is:

1. A display device, comprising:

a processor outputting channel selection information and image data corresponding to an image;

a data driver outputting data signals through channels based on the image data; and a display panel including pixels that emit light based on the data signals, wherein the data driver sets a first output order of the data signals for first channels, which are a selected part of the channels based on channel selection information, to be different from a second output order of the data signals for second channels other than the first channels among the channels, wherein the data driver changes the first output order of the data signals output through the first channels based on data output order information provided from the processor.

2. The display device according to claim 1, wherein the data driver is one integrated circuit.

3. The display device according to claim 1, wherein the first channels include a first channel, a second channel, and a third channel sequentially arranged along a first direction, wherein the data driver outputs a first data signal to the first channel, a second data signal to the second channel, and a third data signal to the third channel according to the first output order, wherein the second channels include a fourth channel, a fifth channel, and a sixth channel sequentially arranged along the first direction, wherein the data driver outputs the third data signal to the fourth channel, the second data signal to the fifth channel, and the first data signal to the sixth channel according to the second output order, and wherein voltage ranges of the first, second, and third data signals are different from each other.

4. The display device according to claim 1, wherein the data driver comprises:

a first digital-to-analog converter configured to generate at least one of the data signals using first gamma voltages of a first voltage range;

a second digital-to-analog converter configured to generate at least one of the data signals using second gamma voltages of a second voltage range; and a third digital-to-analog converter configured to generate at least one of the data signals using third gamma voltages of a third voltage range, wherein each of the channels is connected to one of the first to third digital-to-analog converters, and a connection order between the first to third digital-to-analog converters and the second channels is changed based on the channel selection information.

5. The display device according to claim 1, wherein the channel selection information includes a first value indicating a first channel in the second channels and a second value indicating a last channel in the second channels.

6. The display device according to claim 1, wherein the second output order is a reverse order of the first output order.

7. The display device according to claim 1, wherein the processor provides at least one of the channel selection information and the data output order information to the data driver with a cycle of one frame.

8. The display device according to claim 7, wherein the image data includes frame data, wherein the processor transmits frame protocol data for the frame data, and wherein the frame protocol data includes the channel selection information or the data output order information.

9. The display device according to claim 8, wherein the data driver changes an output order of the channels in a vertical blank period between frame periods in which the frame data is transmitted.

10. The display device according to claim 1, wherein the processor provides the channel selection information or the data output order information to the data driver for each pixel row.

11. The display device according to claim 10, wherein the image data includes line data corresponding to the pixel row, wherein the processor transmits line protocol data for the line data, and wherein the line protocol data for the line data includes the channel selection information or the data output order information.

12. The display device according to claim 11, wherein the data driver changes an output order of the channels in a horizontal blank period between horizontal periods in which the line data are transmitted.

13. The display device according to claim 1, wherein the display panel further includes:

a first display area;

a second display area; and first fan-out lines extending from a non-display area adjacent to the first display area through the first display area and connected to the pixels in the second display area, wherein the first channels correspond to the first display area and the second channels correspond to the second display area, and wherein the second channel group is connected to the pixels in the second display area through the first fan-out lines.

14. The display device according to claim 13, wherein the display panel further includes:

a third display area spaced apart from the second display area with the first display area interposed therebetween; and second fan-out lines extending from a non-display area adjacent to the first display area through the first display area and connected to the pixels in the third display area, wherein the channels further include third channels corresponding to the third display area, and wherein the third channels are connected to the pixels in the third display area through the second fan-out lines.

15. A data driver, comprising:

channels, wherein the data driver is configured to output data signals based on input data corresponding to an image through the channels, wherein, based on channel selection information, the data driver changes an output order of the data signals for some of the channels so that a portion of the image is horizontally inverted, wherein the data driver changes an output order of the data signals output through the some of the channels based on data output order information.

16. The data driver according to claim 15, wherein the data driver is one integrated circuit.

17. The data driver according to claim 15, wherein the channel selection information includes a first value indicating a first channel in the some of the channels and a second value indicating a last channel in the some of the channels.

18. The data driver according to claim 15, comprising:

first, second, and third digital-to-analog converters each configured to generate the data signals using different gamma voltages; and a switching unit connecting the first, second, and third digital-to-analog converters and the channels, wherein the switching unit changes an order of connection between the first, second, and third digital-to-analog converters and some channels selected from among the channels based on the channel selection information.

19. A display device, comprising:

a processor outputting channel selection information and image data corresponding to an image;

a data driver outputting data signals through channels based on the image data; and a display panel including pixels that emit light based on the data signals, wherein the data driver sets a first output order of the data signals for first channels, which are a selected part of the channels based on channel selection information, to be different from a second output order of the data signals for second channels other than the first channels among the channels, wherein the first channels include a first channel, a second channel, and a third channel sequentially arranged along a first direction, wherein the data driver outputs a first data signal to the first channel, a second data signal to the second channel, and a third data signal to the third channel according to the first output order, wherein the second channels include a fourth channel, a fifth channel, and a sixth channel sequentially arranged along the first direction, wherein the data driver outputs the third data signal to the fourth channel, the second data signal to the fifth channel, and the first data signal to the sixth channel according to the second output order, and wherein voltage ranges of the first, second, and third data signals are different from each other.

* * * * *